US010521028B2

(12) United States Patent
Gribetz

(10) Patent No.: US 10,521,028 B2
(45) Date of Patent: Dec. 31, 2019

(54) SYSTEM AND METHOD FOR FACILITATING VIRTUAL INTERACTIONS WITH A THREE-DIMENSIONAL VIRTUAL ENVIRONMENT IN RESPONSE TO SENSOR INPUT INTO A CONTROL DEVICE HAVING SENSORS

(71) Applicant: Meta View, Inc., San Mateo, CA (US)

(72) Inventor: Yishai Gribetz, Belmont, CA (US)

(73) Assignee: Meta View, Inc., San Mateo, CA (US)

(*) Notice: Subject to any disclaimer, the term of this patent is extended or adjusted under 35 U.S.C. 154(b) by 0 days.

(21) Appl. No.: 15/990,321

(22) Filed: May 25, 2018

(65) Prior Publication Data

US 2018/0275781 A1 Sep. 27, 2018

Related U.S. Application Data

(63) Continuation of application No. 15/158,557, filed on May 18, 2016, now Pat. No. 9,983,697.

(51) Int. Cl.
*G06F 3/0354* (2013.01)
*G06T 19/00* (2011.01)
(Continued)

(52) U.S. Cl.
CPC ....... *G06F 3/03545* (2013.01); *G02B 27/017* (2013.01); *G06F 3/011* (2013.01); *G06F 3/017* (2013.01); *G06F 3/0304* (2013.01); *G06F 3/03547* (2013.01); *G06F 3/04815* (2013.01); *G06F 3/04892* (2013.01);
(Continued)

(58) Field of Classification Search
CPC ....... G06T 19/006; G06T 19/20; G06T 11/60; G06T 19/003; G06T 2215/16; G06T 13/40; G06T 19/00; G06F 3/017; G06F 3/04815; G06F 3/0346; G06F 3/048
See application file for complete search history.

(56) References Cited

U.S. PATENT DOCUMENTS 9,983,697 B1 5/2018 Gribetz
2002/0158905 A1 10/2002 Bazzoni
(Continued)

OTHER PUBLICATIONS

Interational Search Report and Written Opinion for PCTIB2017052948 dated Aug. 11, 2017, 16 pages.

*Primary Examiner* — Xilin Guo

(57) ABSTRACT

Various implementations provide for a three-dimensional trackpad in which sensors and a three-dimensional physical region may be used to interact with a three-dimensional virtual environment. The methods, systems, techniques, and components described herein may facilitate interactions with virtual objects in a three-dimensional virtual environment in response to sensor input into a control device having one or more sensors implemented thereon. The control device may be coupled to a display that may be configured to display the three-dimensional virtual environment. In various implementations, the sensor(s) capture physical movement of a user interaction element (a hand, a stylus, a physical object, etc.) within a specified three-dimensional physical region. The physical movement may be translated into a virtual interaction with the three-dimensional virtual environment. A virtual action in the three-dimensional virtual environment may be identified and displayed.

20 Claims, 27 Drawing Sheets

(51) Int. Cl.
*G06F 3/0489* (2013.01)
*G06F 3/01* (2006.01)
*G06F 3/03* (2006.01)
*G06F 3/0481* (2013.01)
*G02B 27/01* (2006.01)

(52) U.S. Cl.
CPC ...... G06T 19/006 (2013.01); *G02B 2027/014* (2013.01); *G02B 2027/0134* (2013.01); *G02B 2027/0138* (2013.01); *G02B 2027/0178* (2013.01); *G02B 2027/0187* (2013.01); *G06T 2200/04* (2013.01)

(56) References Cited

U.S. PATENT DOCUMENTS

| | | |
|---|---|---|
| 2009/0070093 A1* | 3/2009 | Nakanishi ............... A63F 13/00 703/22 |
| 2010/0177931 A1 | 7/2010 | Whytock |
| 2012/0229454 A1 | 9/2012 | Hayashi |
| 2013/0104084 A1* | 4/2013 | Mlyniec ............... G06F 3/0346 715/849 |
| 2013/0117377 A1 | 5/2013 | Miller |
| 2014/0152558 A1 | 6/2014 | Salter |
| 2014/0198101 A1 | 7/2014 | Vilkin |
| 2014/0204002 A1* | 7/2014 | Bennet ................... G06F 3/011 345/8 |
| 2014/0267637 A1 | 9/2014 | Hoberman |
| 2014/0306891 A1 | 10/2014 | Latta |
| 2014/0359540 A1* | 12/2014 | Kelsey .................... G06F 3/017 715/863 |
| 2015/0371441 A1 | 12/2015 | Shim |
| 2016/0217612 A1* | 7/2016 | Petill .................... G06T 19/006 |
| 2017/0052595 A1* | 2/2017 | Poulos ............... G02B 27/0103 |
| 2017/0060230 A1* | 3/2017 | Faaborg ................. G06F 3/011 |
| 2017/0235143 A1 | 8/2017 | Chi |
| 2017/0329419 A1* | 11/2017 | Dearman ............. G06F 3/0346 |
| 2017/0336941 A1 | 11/2017 | Gribetz |

* cited by examiner

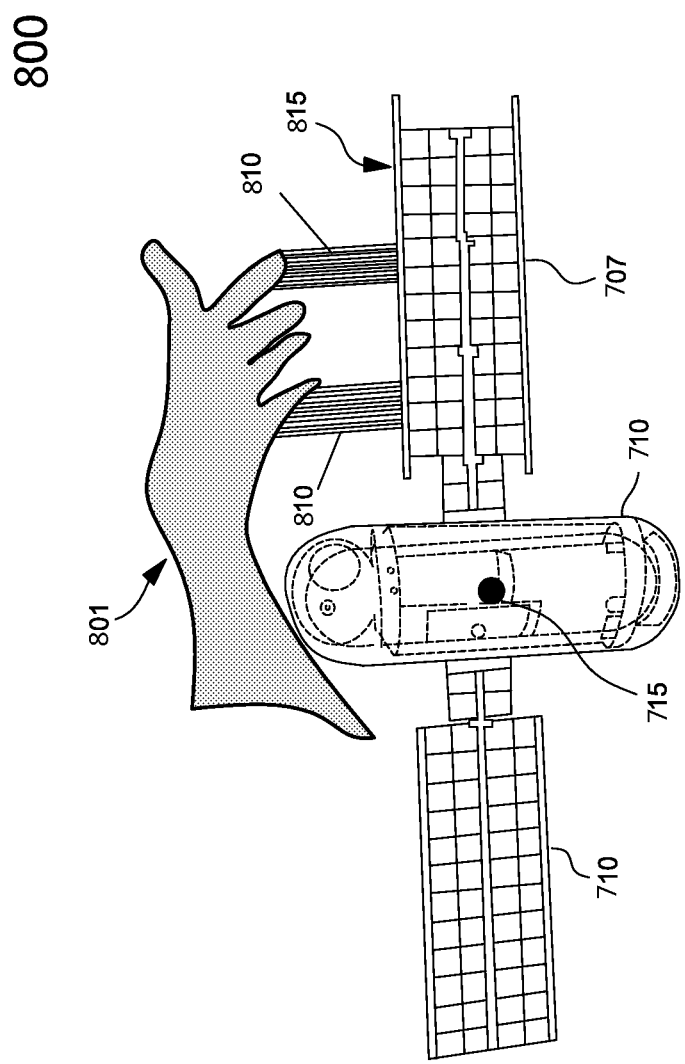

SYSTEM AND METHOD FOR FACILITATING VIRTUAL INTERACTIONS WITH A THREE-DIMENSIONAL VIRTUAL ENVIRONMENT IN RESPONSE TO SENSOR INPUT INTO A CONTROL DEVICE HAVING SENSORS

FIELD

The disclosure relates to facilitating user interactions with a three-dimensional virtual environment, such as a three-dimensional Virtual Reality (VR) environment or a three-dimensional Augmented Reality (AR) environment, in response to sensor input into a control device having one or more sensors implemented thereon.

BACKGROUND

It is often difficult to model many interactions with virtual environments, particularly three-dimensional virtual environments. A user may find it convenient to take specific interactions (virtually touch/feel, rotate, and/or translate, etc.) on virtual objects when the user is in an ergonomically convenient position, such as a position at a seated desk or standing desk. However, the user may find these interactions tedious, strenuous, or otherwise difficult when the user is outside the ergonomically convenient position. As an example, a user may find it difficult to maintain the user's wrist above a specified angle relative to a rest position. User interactions outside an ergonomically convenient position may lead to exhaustion, decreased productivity, and lower work product.

It may be desirable to facilitate interactions with virtual objects in a three-dimensional virtual environment while allowing users to maintain ergonomically convenient positions. It may be desirable to ensure interactions with a virtual environment taken from ergonomically convenient positions appear realistic, credible, natural, and/or fluid. These problems may persist in pure-Virtual Reality (VR) environments where virtual objects do not correspond to and/or are not superimposed over real-world objects in the real-world, as well as Augmented Reality (AR) and/or mixed environments where virtual objects may correspond to and/or be superimposed over real-world objects that reside in the physical world.

SUMMARY

Various implementations provide for a "three-dimensional trackpad" in which sensors and a three-dimensional physical region around the sensors may be used to interact with at least portions of a three-dimensional virtual environment. The methods, systems, techniques, and components described herein may facilitate interactions with virtual objects in a three-dimensional virtual environment in response to sensor input into a control device having one or more sensors implemented thereon. The control device may be coupled to a display system that may be configured to display the three-dimensional virtual environment. In various implementations, the sensor(s) capture physical movement of a user interaction element (a hand, a stylus, a physical object attached to the user, etc.) within a specified three-dimensional physical region. The physical movement may be translated into a virtual interaction with the three-dimensional virtual environment. A virtual action in the three-dimensional virtual environment may be identified and displayed.

In some implementations, the specified three-dimensional region may be identified before receiving the sensor signal from the one or more sensors. In some implementations, the three-dimensional physical region may be proximate to, or sufficiently near, the one or more sensors in order for the one or more sensors to capture the physical movement.

The physical movement may comprise any motion within the three-dimensional physical region, including but not limited to: a horizontal translation of the user interaction element, a vertical translation of the user interaction element, a pitch of the user interaction element, a roll of the user interaction element, a yaw of the user interaction element, or some combination thereof. The one or more sensors may comprise a depth camera configured to capture one or more images of the user interaction element, and to sense a depth of the user interaction element in a direction orthogonal to the control device. The one or more sensors may capture the physical movement in other ways as described further herein.

In various implementations, the control device may comprise a mobile phone or a tablet computing device. The mobile phone/tablet computing device may, but need not, have a depth camera attached thereto. The depth camera may capture the physical movement.

The methods, systems, techniques, and components described herein may model the virtual interaction with the virtual environment in a variety of ways. Relevant interaction techniques may include collisions in the three-dimensional virtual environment that result from modeling the user interaction element as a virtual object that can collide with virtual objects in the three-dimensional virtual environment. Relevant interaction techniques may further include the results of virtual physics calculations that are caused by interactions between virtual objects in the three-dimensional virtual environment and a point cloud representative of the user interaction element and discussed further herein.

In some implementations, the virtual action may comprise a movement of a virtual object across the three-dimensional virtual environment. The virtual object may comprise a three-dimensional virtual cursor, such as a three-dimensional virtual object that is used to identify a user's position in the three-dimensional virtual environment, select and/or take virtual actions on other virtual objects, etc.

In various implementations, the virtual action may comprise a first movement of a virtual object across the three-dimensional virtual environment at a first virtual speed, and a second movement of the virtual object across the three-dimensional virtual environment at a second virtual speed. In some implementations, it may be determined whether the user interaction element has exceeded a specified movement threshold, and an object speed of the virtual object may be modified from the first virtual speed to the second virtual speed if the user interaction element has exceeded the specified movement threshold.

In various implementations, the display may comprise a dedicated headset configured to display the three-dimensional virtual environment. The control device may be coupled to the display system over a computer network. The method may be executed by a processor of the display system.

The detailed description herein is merely exemplary in nature and is not intended to limit the described implementations (examples, options, etc.) or the application and uses of the described implementations. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable making or using the implementations of the disclosure and are not intended to limit the scope of the disclosure. For purposes of the description herein, the terms "upper," "lower," "left," "rear," "right," "front," "vertical," "horizontal," and similar terms or derivatives thereof shall relate to the examples as oriented in the drawings and do not necessarily reflect real-world orientations unless specifically indicated. Furthermore, there is no intention to be bound by any expressed or implied theory presented in the following detailed description. It is also to be understood that the specific devices, arrangements, configurations, and processes illustrated in the attached drawings, and described in the following specification, are exemplary implementations (examples), aspects and/or concepts. Hence, specific dimensions and other physical characteristics relating to the implementations disclosed herein are not to be considered as limiting, except in the context of any claims which expressly state otherwise. It is understood that "at least one" is equivalent to "a."

The aspects (examples, alterations, modifications, options, variations, implementations and any equivalent thereof) are described with reference to the drawings; it should be understood that the descriptions herein show by way of illustration various implementations in which claimed inventions may be practiced and are not exhaustive or exclusive. They are presented only to assist in understanding and teach the claimed principles. It should be understood that they are not necessarily representative of all claimed inventions. As such, certain aspects of the disclosure have not been discussed herein. That alternate implementations may not have been presented for a specific portion of the invention or that further alternate implementations which are not described may be available for a portion is not to be considered a disclaimer of those alternate implementations. It will be appreciated that many implementations not described incorporate the same principles of the invention and others that are equivalent. Thus, it is to be understood that other implementations may be utilized and functional, logical, organizational, structural and/or topological modifications may be made without departing from the scope and/or spirit of the disclosure.

These and other objects, features, and characteristics of the present disclosure, as well as the methods of operation and functions of the related components of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of any limits. As used in the specification and in the claims, the singular form of "a", "an", and "the" include plural referents unless the context clearly dictates otherwise.

BRIEF DESCRIPTION OF THE DRAWINGS

FIGS. 8A and 8B illustrate examples of application of sensor inputs, vectors, and primitives to content, in accordance with one or more implementations.

DETAILED DESCRIPTION

I. Example Virtual Environment Control System 100

Figure 1:
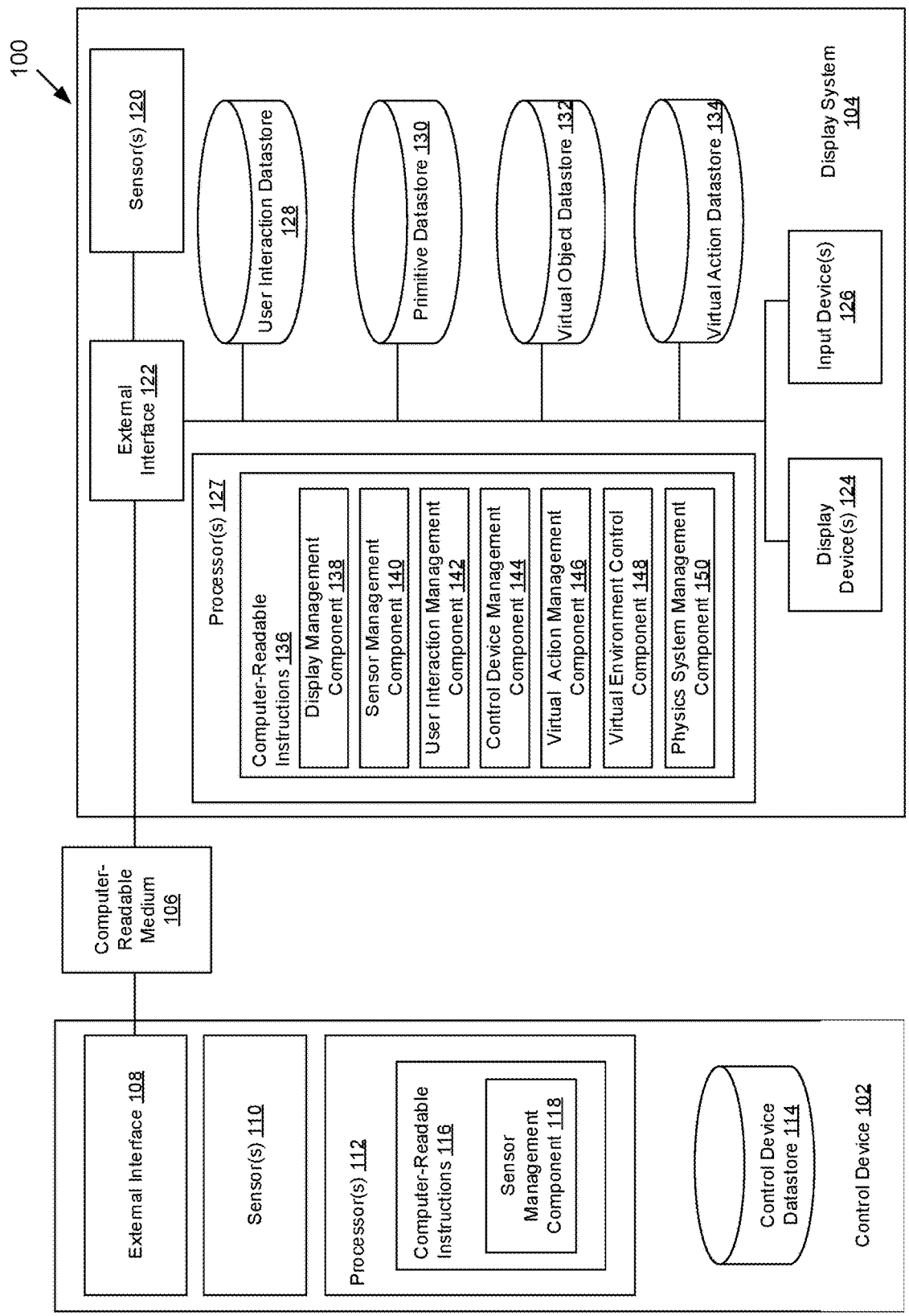
FIG. 1 illustrates an example of a virtual environment control system for controlling a three-dimensional virtual environment, in accordance with some implementations.

FIG. 1 illustrates an example of a virtual environment control system 100 for controlling a three-dimensional virtual environment, in accordance with some implementations. The virtual environment control system 100 may include a control device 102, a display system 104, and a computer-readable medium 106. The control device 102 and the display system 104 may be coupled to one another through the computer-readable medium 106. It is expressly noted the couplings shown in FIG. 1 are by way of example only, and that in various implementations, one or more of the control device 102 and the display system 104 may be incorporated within one another and/or otherwise configured without departing from the scope and substance of the inventive concepts described herein.

A. Control Device 102

The control device 102 may include a digital device that is configured to identify physical movement of a user interaction element within a specified three-dimensional physical region. The control device 102 may provide to the display system 104 a sensor signal based on the physical movement and used as the basis of controlling a three-dimensional virtual environment displayed by the display system 104. The sensor signal may also form a basis for controlling virtual objects displayed in the three-dimensional virtual environment. A "user interaction element," as described herein, may refer to any real-world object used to interact with a three-dimensional virtual environment. Examples of user interaction elements may include a user's hand, a stylus, a real-world object attached to a user, etc. The control device 102 may comprise a mobile phone, a tablet computing device, a laptop, etc. having sensors attached thereon.

A "virtual environment," as used herein, may refer to a virtual space that represents an environment, real or imaginary, and simulates a user's presence in a way that allows the user to interact with the environment. A virtual environment may, but need not, contain "virtual objects," which as used herein, may refer to any objects that are displayed in the virtual environment but are not part of the physical world. A "virtual element" may include an element used to build or otherwise make up a virtual object. Virtual elements and/or virtual objects may be assembled from primitives, discussed further herein. As also discussed further herein, the virtual environment may facilitate interactions with virtual objects. Examples of interactions include moving, resizing, rotating, etc. the virtual objects within the virtual environment. It is further noted that a "real world object" may comprise any object in the physical world, and may include animate items, inanimate items, physical objects/elements used to form the basis of a point cloud, etc. A "three-dimensional virtual environment," as used herein, may refer to a virtual environment that is capable of displaying three-dimensional virtual objects to a user.

The three-dimensional virtual environment may be part of a pure-VR environment or an AR/mixed reality environment. A "pure-VR environment," as used herein, may include a virtual environment that does not display the physical world to a user. In a pure-VR environment, virtual objects need not correspond to and/or need not be superimposed over real-world objects in the physical world. An "AR environment," or interchangeably, a "mixed-reality environment," as used herein, may refer to a virtual environment that displays the physical world to a user. The portions of the physical world visible to a user may correspond to a physical environment around the user.

An AR/mixed-reality environment may include attributes of a virtual environment, including virtual objects superimposed over portions of the physical environment. In some implementations, an AR environment may represent physical objects in the physical world as virtual objects in the augmented environment and/or may superimpose virtual objects over a perspective of the physical world. The virtual objects may, but need not, appear to a user to be different from the physical objects that the virtual objects correspond to in the virtual environment. As an example, a virtual object representing a computer screen in an augmented environment may have the same size dimensions, etc. as the physical object (i.e., the computer screen); however, the virtual object may also have different size dimensions, etc. than the physical object. As discussed further herein, an AR environment may facilitate interactions with virtual objects. Examples of interactions include moving, resizing, rotating, etc. the virtual objects within the augmented environment.

The control device 102 may include an external interface 108, sensor(s) 110, processor(s) 112, and a control device datastore 114. The external interface 110 may comprise any computer-readable medium that couples the components of the control device 102 to one another. In some implementations, at least a portion of the external interface 110 includes a bus or other data conduit or data plane. In various implementations, the external interface 110 may support a coupling and/or connection to the computer-readable medium 106.

The sensor(s) 110 may include hardware configured to sense a physical property near the control device 102. In some implementations, the sensor(s) 110 may comprise one or more Inertial Measurement Units (IMUs), accelerometers, gyroscopes, etc. that provide movement data related to how real-world objects near the sensor(s) 110 are moving. In various implementations, the sensor(s) 110 may include a camera that captures images (still or moving) of a real-world object within a field of view of the camera. The camera that forms a part of the sensor(s) 110 may include or be coupled to depth sensors that sense distance of real-world objects along an axis orthogonal to the camera. In various implementations, the sensor(s) 110 include a depth camera that simultaneously captures images of real-world objects and distances of those real-world objects. The sensor(s) 110 may provide sensor data to other modules of the control device 102, including the sensor management component 118, as discussed further herein.

In some implementations, the sensor(s) 110 may sense the physical property within a specified three-dimensional physical region, which may, but need not, be near/proximate the sensor(s) 110. The three-dimensional physical region may comprise a region in the physical world in which the sensor(s) 110 are capable of sensing the physical property. In some implementations, the three-dimensional physical region may correspond to a zone inside which a user is able to provide instructions to control the three-dimensional virtual environment. As an example, the three-dimensional physical region may correspond to a box or other three-dimensional region around the control device 102 inside which the sensor(s) 110 track movements of a user interaction element (e.g., a user's hand movements, stylus movements, movements of a physical object). In various implementations, the three-dimensional physical region may have a length dimension, a width dimension, and a height dimension.

In various implementations, the user interaction element may comprise a user's hand, and the sensor(s) 110 may detect one or more hand movements of a user's hand. One or more cameras implemented by the sensor(s) 110 may capture translational and/or rotational movements (positions, velocities, accelerations, etc.) of the user's hand within the three-dimensional physical region. A depth camera implemented by the sensor(s) 110 may capture distances of the user's hand from the sensor(s) 110. As noted herein, translations, rotations, and other hand movements may provide a basis of virtual interactions with the three-dimensional virtual environment. In some implementations, the sensor(s) 110 may sense physical movements outside the three-dimensional physical region and may provide the sensor management component 118 with information regarding the same.

The processor(s) 112 may be configured to provide information processing capabilities to components of the control device 102. In some implementations, the processor(s) 112 may include one or more of a digital processor, an analog processor, and a digital circuit designed to process information, an analog circuit designed to process information, a state machine, and/or other mechanisms for electronically processing information. The processor(s) 112 may include single processor, a plurality of processing units (e.g., a plurality of CPUs and/or GPUs), etc. which may or may not be physically located within the same device or a plurality of devices operating in coordination.

The processor(s) 112 may be configured to execute one or more computer-readable instructions 116. In some implementations, the processor(s) 112 may be configured to execute the computer-readable instructions 116 by software, hardware, firmware, or some combination of software, hardware, and/or firmware; and/or other mechanisms for configuring processing capabilities on processor(s) 112.

The description of the functionality provided by the components in the computer-readable instructions 116 described herein is for illustrative purposes, and is not intended to be limiting, as any of the components in the computer-readable instructions 116 may provide more or less functionality than is described. For example, one or more of the components in the computer-readable instructions 116 may be eliminated, and some or all of its functionality may be provided by other components in the computer-readable instructions 116. As another example, the processor(s) 112 may be configured to execute one or more additional components that may perform some or all of the functionality attributed herein to any of the components illustrated to reside in the computer-readable instructions 116.

The computer-readable instructions 116 may comprise a sensor management component 118. The sensor management component 118 may be configured to format sensor data captured by the sensor(s) 102 into a format that can be provided to the display system 104. In various implementations, the sensor management component 118 may gather the sensor data from the sensor(s) 102 and provide the sensor data to the external interface 108. In various implementations, the sensor management component 118 may format the sensor data so that the sensor data can be transmitted over the computer-readable medium 106. In some implementations, the sensor management component 118 may receive instructions to identify a three-dimensional physical region for capturing sensor data. Instructions may, but need not, come from the control device management component 144. The instructions may specify length dimension(s), width dimension(s), and/or height dimension(s) of the three-dimensional physical region and/or other information for configuring the control device 102. In some implementations, the sensor management component 118 may determine whether or not sensor data related to physical movement outside the three-dimensional physical region. If so, the sensor management component 118 may indicate that the sensor data related to physical movement outside the three-dimensional physical region.

The control device datastore 114 may include a datastore configured to support the control device 102. The control device datastore 114 may have one or more attributes of the user interaction datastore 128, the primitive datastore 130, the virtual object datastore 132, and the virtual action datastore 134. The control device datastore 114 may be configured to store sensor data and/or other relevant data.

Though the foregoing description discloses the functionalities as associated with the control device 102, the functionalities described in relation to the control device 102 may also be performed by the display system 104, as noted further herein.

B. Display System 104

The display system 104 may comprise a digital device configured to display a three-dimensional virtual environment to a user. In some implementations, the display system 104 may comprise a dedicated headset configured to display a three-dimensional virtual environment. In various implementations, the display system 104 may be incorporated into a portable computing device, such as a wireless phone, a tablet computing device, a laptop, etc. The three-dimensional virtual environment provided by the display system 104 may comprise a pure-VR environment or an AR/mixed reality environment. The display system 104 may include sensor(s) 120, an external interface 122, a display device(s) 124, input device(s) 124, processor(s) 126, a user interaction datastore 128, a primitive datastore 130, a virtual object datastore 132, and a virtual action datastore 134. The display system 104 may include some or all of the components of the example Head Mounted Display (HMD) system 1700, shown in FIGS. 17A, 17B, 17C, 17D, and 17E.

a. Sensor(s) 120, External Interface 122, Display Device(s) 124, Input Device(s) 124, and Processor(s) 127

The sensor(s) 120 may include one or more devices that obtain sensor data about a physical property (light, motion, distance, sound, heat, pressure, magnetism, etc.) in the physical world and provide one or more components of the display system 104 with a signal that represents the sensor data. In some implementations, the sensor(s) 120 include a motion sensor that senses movement of a user or of a component of the display system 104. The sensor(s) 120 may also include an Inertial Measurement Unit (IMU), an accelerometer, a gyroscope, etc. that senses translational and/or rotational motion by a user or of a component of the display system 104. In some implementations, the sensor(s) 120 may include a camera that gathers images of a physical environment surrounding a user or a component of the display system 104. The camera may comprise a still camera that captures still images of the physical environment or a motion camera that captures videos or other motion pictures of the physical environment. In various implementations, the sensor(s) 120 comprise a depth-camera. A "depth-camera," as used herein, may refer to a device or a component that has the capability to capture still and/or moving images, and has the ability to sense distances of objects away from it.

In various implementations, the sensor(s) 120 may form a part of a pure-VR system that senses behavior of a user, the physical environment around a user, and/or other physical properties. In some VR implementations, the sensor(s) 120 may include IMUs, accelerometers, gyroscopes, etc. that provide movement data related to how a user is moving; the movement data may be used as the basis of perspectives, etc. used in a virtual environment managed by the VR system. The sensors(s) 202 may include depth sensors, cameras, and/or other devices that sense the physical environment around a user. In some implementations, the sensor(s) 120 may sense contours and/or provide meshes that correspond to the shapes of real-world objects in the physical environment surrounding the display system 104. The sensor(s) 120 may be incorporated into a pure-VR system.

In some implementations, the sensor(s) 120 may form a part of an AR/mixed reality system. The sensor(s) 120 may include IMUs, accelerometers, gyroscopes, etc. that provide movement data related to how a user is moving; the movement data may be used as the basis of perspectives, etc. used in an augmented environment. Further, in some implementations, the sensor(s) may comprise a depth-camera used in an AR/mixed reality system to capture still and/or moving images of the physical environment and to provide distances of objects away from the depth-camera for use in the AR environment. The sensor(s) 120 may sense contours and/or provide meshes that correspond to the shapes of real-world objects in the physical environment surrounding the display system 104.

In some implementations, the sensor(s) 120 may sense a physical property within a specified three-dimensional physical region. The specified three-dimensional region may, but need not, be near/proximate the sensor(s) 110. As an example, the specified three-dimensional region may reside within an approximate area of a rest position of a user interaction element (e.g., a rest position of a user's hand in an ergonomic working setup). The three-dimensional physical region may comprise a region in the physical world in which the sensor(s) 120 are capable of sensing the physical property. In some implementations, the three-dimensional physical region may correspond to a zone inside which a user is able to provide instructions to control the three-dimensional virtual environment. As an example, the three-dimensional physical region may correspond to a box or other three-dimensional region inside which the sensor(s) 120 track movements of a user interaction element (e.g., a user's hand movements, stylus movements, movements of a physical object). In various implementations, the three-dimensional physical region may have a length dimension, a width dimension, and a height dimension. In these implementations, the sensor(s) 120 may provide sensor data to, e.g., the sensor management component 140, which in turn, may provide the sensor data to other modules, e.g., the user interaction management component 142.

The external interface 122 may comprise any computer-readable medium that couples the other components of the display system 104 to one another. In some implementations, at least a portion of the external interface 122 includes a bus or other data conduit or data plane. In some implementations, at least two components of the display system 104 are co-located on a single digital device. Further, in various implementations, at least a portion of the external interface 122 includes a computer network or a part of a computer network. In various implementations, at least two components of the display system 104 are located on different digital devices that are coupled to one another by the computer network. It is noted that the computer network may include a wireless or a wired back-end network or a Local Area Network (LAN). In some implementations, the computer network encompasses a relevant portion of a Wide Area Network (WAN) and/or other network. In various implementations, the external interface 122 may support a coupling and/or connection to the computer-readable medium 106.

The display device(s) 124 may include one or more devices that are configured to display images, video, and/or other data to a user. In some implementations, the display device(s) 124 are implemented using Cathode Ray Tube (CRT), Plasma Display, Liquid Crystal Display (LCD), Light Emitting Diode (LED) technologies, and/or fiber optic projector systems. The display device(s) 124 may be configured to display a virtual environment, either alone (in replacement of the real world environment), or in an augmented environment. In some implementations, the display device(s) 124 displays virtual objects, interactions with virtual objects, etc. In some implementations, the display device(s) 124 may comprise at least a portion of the input device(s) 126 as discussed further herein. For instance, at least a portion of the input device(s) 126 may be incorporated into the display device(s) 124. The display device(s) 124 may include a transparent portion that allows a user to see at least a portion of the physical world around the user. As an example, the display device(s) 124 may comprise transparent see-through glass/plastic/other material on which users can see virtual objects superimposed over the physical world and/or representative of real-world objects.

The display system 104 may, but need not include one more input device(s) 126. The input device(s) 126 may include one or more devices that receive user input from a user. The input device(s) 126 may comprise physical keyboards, joysticks, mice, trackpads, other peripherals, and/or portions of a touchscreen display. As an example, the input device(s) 126 may, in some implementations, comprise portions of touchscreen displays that facilitate and/or initiate interactions with virtual environments supported by the systems and methods herein. The input device(s) 126 may be configured to display menus related to selection and/or manipulation of virtual objects, related to aspects of a three-dimensional virtual environment, and/or related to facilitating interaction with virtual objects (e.g., immersed virtual objects) in a three-dimensional virtual environment.

The processor(s) 127 may be configured to provide information processing capabilities to components of the display system 104. In some implementations, the processor(s) 127 may include one or more of a digital processor, an analog processor, and a digital circuit designed to process information, an analog circuit designed to process information, a state machine, and/or other mechanisms for electronically processing information.

Although the processor(s) 127 are shown in FIG. 1 as a single block, this is for illustrative purposes only. In some implementations, processor(s) 127 may include a plurality of processing units (e.g., a plurality of CPUs and/or GPUs). These processing units may be physically located within the same device, or processor(s) 127 may represent processing functionality of a plurality of devices operating in coordination. The processor(s) 127 may be configured to execute one or more computer-readable instructions 136. In some implementations, the processor(s) 127 may be configured to execute the computer-readable instructions 136 by software, hardware, firmware, or some combination of software, hardware, and/or firmware; and/or other mechanisms for configuring processing capabilities on processor(s) 127.

b. Computer-Readable Instructions 136

The computer-readable instructions 136 may include a display management component 138, a sensor management component 140, a user interaction management component 142, a control device management component 144, a virtual action management component 146, a virtual environment control component 148, and a physics system management component 150. It should be appreciated that although these components are illustrated in FIG. 1 as being co-located within a single processing unit (e.g., the processor(s) 127), in implementations in which processor(s) 127 includes only some of these components, with the other components being located remotely from the processor(s) 127.

The description of the functionality provided by the components in the computer-readable instructions 136 described herein is for illustrative purposes, and is not intended to be limiting, as any of the components in the computer-readable instructions 136 may provide more or less functionality than is described. For example, one or more of the components in the computer-readable instructions 136 may be eliminated, and some or all of its functionality may be provided by other components in the computer-readable instructions 136. As another example, the processor(s) 127 may be configured to execute one or more additional components that may perform some or all of the functionality attributed herein to any of the components illustrated to reside in the computer-readable instructions 136.

(1) Display Management Component 138

The display management component 138 may include computer-readable instructions configured to manage the display device(s) 124. In some implementations, the display management component 138 includes instructions for addressing portions of the display device(s) 124 to display specific aspects of a virtual environment, either alone, or as part of an augmented environment. For example, the display management component 138 may include instructions to address specific pixels of the display device(s) 124 with specific colors, images, virtual objects, etc. that are provided to the user as part of a virtual environment. In various implementations, the display management component 138 may select specific colors, images, virtual objects, etc. based on attributes of the physical environment surrounding a user to implement an augmented environment. In various implementations, the display management component 138 may select specific colors, images, virtual objects, etc. based on a state of a virtual environment and/or user interactions taken (e.g., user interactions taken on virtual objects) in the virtual environment. The display management component 138 may configure the display device(s) 124 to display a three-dimensional virtual environment that includes one or more immersed virtual objects, as described further herein.

(2) Sensor Management Component 140

The sensor management component 140 may include computer-readable instructions configured to manage the sensor(s) 120 in the display system 104. The sensor management component 140 may be coupled to graphics processing hardware, software, and/or firmware for processing images, and/or other hardware, software, and/or firmware for processing other forms of sensor data. In various implementations, the sensor management component 140 may obtain image, depth, and/or other data from the sensor(s) 120 and/or may extract image information, depth and/or other positional information, etc. from the data. The sensor management component 140 may be configured to provide the extracted information to the physics system management component 150 and/or other components of the display system 104.

(3) User Interaction Management Component 142

The user interaction management component 142 may include computer-readable instructions configured to manage user interactions from devices that can receive user interactions, including but not limited to the input device(s) 126 and/or other devices coupled to the display system 104. In some implementations, the user interaction management component 142 is coupled to peripheral processing hardware, software, and/or firmware that manage the devices that receive user interactions.

The user interaction management component 142 may provide to the physics system management component 150 any user interaction data that is based on user input into the devices that receive user interactions. "User interaction data," as discussed herein, may refer to user input into the devices that receive user interactions, the input allowing a user to interact with at least a portion of a virtual environment supported by the display system 104 (e.g., a three-dimensional virtual environment displayed on the display device(s) 124). In some implementations, the user interaction data may comprise interactions with at least portions of a virtual environment, such as interactions with virtual objects in a virtual environment. The virtual environment may, but need not, be incorporated in an augmented environment, as discussed further herein. In some implementations, the user interaction management component 142 may recognize and/or receive one or more "gestures," or user interactions that can be recognized as specific attempts to interact with the virtual environment.

In some implementations, the user interaction data managed by the user interaction management component 142 may be based on sensor data from the sensor(s) 120 and/or managed by the sensor management component 140. The sensor data may be based on images taken, e.g., by a still or motion camera coupled to and/or implemented by the sensor(s) 120. The sensor data may be based on depth points (e.g., points along a line orthogonal to the sensor(s) 120) taken by a depth-sensor coupled to and/or implemented by the sensor(s) 120. In various implementations, the sensor data is taken from IMUs, gyroscopes, accelerometers, and/or other motion sensors coupled to and/or implemented by the sensor(s) 120.

In various implementations, the user interaction management component 142 may identify portions of the virtual environment that correspond to specific user interactions. The user interaction management component 142 may identify where sensor data obtained from the sensor(s) 120 and/or managed by the sensor management component 140 is to be projected into a virtual environment managed by the display system 104. As examples, the user interaction management component 142 may identify if/whether specific user interactions or gestures are related to known virtual points, etc. in the virtual environment. The user interaction management component 142 may further identify whether these virtual points correspond to locations of virtual objects, virtual coordinates/locations, etc. in the virtual environment. In various implementations, the user interaction management component 142 may modify a state, a property, etc. of a virtual object, virtual coordinate/location etc. based on one or more user interactions. The user interaction management component 142 may, for instance, provide instructions to modify an interactive volume of a virtual object, such as an immersed virtual object immersed in a three-dimensional virtual environment based on user interaction data.

(4) Control Device Management Component 144

The control device management component 144 may include computer-readable instructions configured to manage the control device 102. In some implementations, the control device management component 144 may be configured to provide instructions to the sensor management component 118 to manage the sensor(s) 110 on the control device 102. The control device management component 144 may provide instructions to the sensor management component 118 to manage graphics processing hardware, software, and/or firmware for processing images, and/or other hardware, software, and/or firmware for processing other forms of sensor data from the sensor(s) 110. In various implementations, the control device management component 144 may obtain from the sensor management component 118 image, depth, and/or other sensor data gathered the sensor(s) 120; the control device management component 144 may extract image information, depth and/or other positional information, etc. from the sensor data.

In some implementations, the control device management component 144 may provide the control device 102 with a three-dimensional physical region in which the control device is to capture physical movement by a user interaction element. The three-dimensional physical region may comprise a length dimension, a width dimension, and/or a height dimension. The three-dimensional physical region may comprise any three-dimensional shape that would establish one or more boundaries for the sensor(s) 110 to capture physical movements.

In various implementations, the control device management component 144 may identify physical movements represented by sensor data captured by the sensor(s) 110. The control device management component 144 may determine whether/how specific translations, rotations, etc. by a user interaction element may correspond to virtual movements in a three-dimensional virtual environment. As an example, the control device management component 144 may determine whether/how translations, rotations, etc. by a hand, stylus, or physical object attached to a user translate to translations, rotations, etc. in the three-dimensional virtual environment. The control device management component 144 may provide information related to physical movements to one or more other modules of the display system 104, such as the virtual action management component 146.

In some implementations, the control device management component 144 may determine whether or not a user interaction element is outside the three-dimensional physical region. If so, the control device management component 144 may instruct other components (e.g., the virtual environment control component 148) to maintain a state of the three-dimensional virtual environment.

(5) Virtual Action Management Component 146

The virtual action management component 146 may include computer-readable instructions configured to identify and/or manage virtual actions in the three-dimensional virtual environment. The virtual action management component 146 may be configured to receive from the control device management component 144 information related to physical movements, and may use the virtual action datastore 134 to translate the representation of the physical movement with a corresponding virtual interaction with the three-dimensional virtual environment. A "virtual interaction," as used herein, may refer to interactions by a user with the three-dimensional virtual environment. The virtual action management component 146 may use the virtual interaction to identify a virtual action in the three-dimensional virtual environment.

A "virtual action," as used herein, may refer to any actions taken by a user in the on a virtual object or other aspect of a three-dimensional virtual environment. Virtual actions may include creating, modifying, selecting, managing, etc. virtual objects, selecting specific points, lines, planes, or three-dimensional regions of a three-dimensional virtual environment, etc. In various implementations, a virtual action may comprise moving a virtual object, such as a three-dimensional virtual object representing a three-dimensional virtual cursor, from a first location in the three-dimensional virtual environment to a second location in the three-dimensional virtual environment. A "three-dimensional virtual cursor," as used herein, may comprise a virtual object of arbitrary shape (cube, sphere, star, etc.) that represents a position of a user in a three-dimensional virtual environment. Examples of three-dimensional virtual cursors can be seen at least in FIG. 2A, FIG. 2B, and FIG. 3.

Virtual actions may, but need not, correspond to physical movements captured by the sensor(s) 110. As an example, a physical translation of a user interaction element captured by the sensor(s) 110 may correspond to a virtual translation of a three-dimensional virtual cursor in the three-dimensional virtual environment. As another example, a pinch, a zoom, a swipe or other gestural physical movement captured by the sensor(s) 110 may correspond to a virtual pinch, virtual zoom, virtual swipe, etc. in the three-dimensional virtual environment.

In various implementations, the virtual action management component 146 may magnify the physical movement to obtain a corresponding virtual motion in the three-dimensional virtual environment. As an example of magnification, a user may move his or her hand one inch in the three-dimensional physical region monitored by the sensor(s) 110. The movement may correspond to a request to move a three-dimensional virtual cursor ten virtual feet in the three-dimensional virtual world. A subsequent movement of the hand two inches in the three-dimensional physical region may translate to a request to move the three-dimensional virtual cursor twenty virtual feet in the three-dimensional virtual world.

In some implementations, a physical movement may correspond to a first movement of a virtual object across the three-dimensional virtual environment at a first virtual speed, and a second movement of the virtual object across the three-dimensional virtual environment at a second virtual speed. In various implementations, the virtual action management component 146 may use sensor data from the sensor(s) 110 to determine whether a user interaction element has exceeded a specified movement threshold, and may modify an object speed of the virtual object from the first virtual speed to the second virtual speed if the user interaction element has exceeded the specified movement threshold, thereby implementing two or more virtual movement speeds in the three-dimensional virtual environment.

The virtual action management component 146 may be configured to provide information about virtual actions to the other modules of the display system 104, such as the virtual environment control component 148.

(6) Virtual Environment Control Component 148

The virtual environment control component 148 may include computer-readable instructions configured to instruct the display device(s) 106 to display a three-dimensional virtual environment. The virtual environment control component 148 may further include computer-readable instructions configured to instruct the display device(s) 124 to display virtual objects, including immersed virtual objects in the three-dimensional virtual environment.

In some implementations, the virtual environment control component 148 may receive instructions from the virtual action management component 146 to display virtual actions in the three-dimensional virtual environment. The instructions may specify the specific virtual action as well as attributes of virtual object associated with the virtual action. As examples, the instructions may specify specific virtual perspectives of virtual objects, specific movements of virtual objects in the three-dimensional virtual environment, and/or specific virtual physical properties of virtual objects provided in response to interactions managed by the physics system management component 150 described further herein.

(7) Physics System Management Component 150

The physics system management component 150 may include computer-readable instructions configured to manage a physics system for a virtual environment supported by the display system 104. A "physics system," as used herein, may refer to a set of rules that govern physical relationships of virtual objects in the virtual environment. In some implementations, the physics system implemented by the physics system management component 150 may implement rules for force determination in the virtual environment, rules to select and/or manage primitives that form the basis of virtual objects in the virtual environment, rules to define interactive volumes of virtual objects in the virtual environment, and/or rules that allow for and/or define manipulation of virtual objects in the virtual environment.

(a) Force Determinations by Physics System Management Component 150

In some implementations, the physics system management component 150 implements force determinations for virtual objects in a virtual environment. In various implementations, the physics system management component 150 may gather virtual objects from the virtual object datastore 132, and may implement force determinations on these virtual objects based on rules assigned to those virtual objects and/or user interaction data from the user interaction management component 142.

One example of the types of force determinations that may be applied includes force determinations based on virtual electromagnetic forces between virtual objects in the virtual environment. Though the discussion herein discusses force determinations based on virtual electromagnetic forces (e.g., on Coulomb's Law) in greater detail, it is noted that the physics system management component 150 may determine virtual forces between virtual objects based on any virtual physical forces and/or other forces, including but not limited to virtual gravitational forces, virtual thermodynamic forces, virtual chemical forces, virtual atomic weak forces, virtual atomic strong forces, etc.

Figure 4:
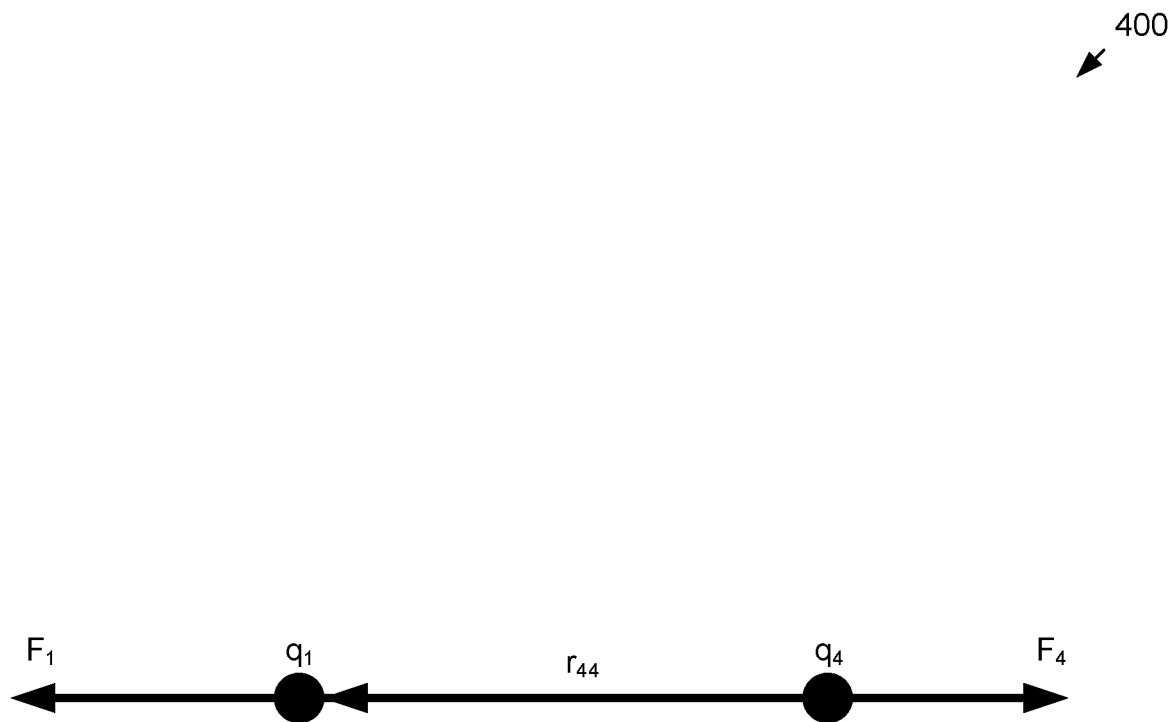
FIG. 4 illustrates an example of a force diagram showing manipulation of virtual input/output (I/O) elements using forces, in accordance with one or more implementations.

As a result, in some implementations, the physics system management component 150 determines forces between virtual objects based on virtual electromagnetic forces between the virtual objects. Turning to FIG. 4, FIG. 4 shows an illustration 400 of an example of how force may be applied to virtual objects and/or virtual objects. By assigning a charge to a point associated with a virtual object and a separate charge to a point of input associated with a real world element and/or real-world object detected by a sensing device, the elements' interaction can be governed by Coulomb's Law, which models the electric forces between two charges. For example, the magnitude of the electrostatic force of interaction between two point charges can be programmed to be directly proportional to the scalar multiplication of the magnitudes of charges and inversely proportional to the square of the distance between them. The force is applied along the straight line joining the points. If the two points have the same charge (e.g., positive and positive), the virtual electrostatic force between them is repellant (e.g., the points try move away from one another); if the two points have different charges (e.g., positive and negative), the virtual force between them is attractive (e.g., the points try to move towards one another), as shown in FIG. 4.

Coulomb's law can be stated as a mathematical expression. The scalar and vector forms of the mathematical equation are given by:

$$|F| = k_e \frac{|q_1 q_2|}{r^2} \text{ and} \qquad \text{Equation 1}$$

$$|F| = k_e \frac{|q_1 q_2|}{|r_{21}|^2} r^{21}, \qquad \text{Equation 2}$$

respectively, where $k_e$ is Coulomb's constant $k_e = 8.9875 \times 10^9$ N·m$^2$·C$^{-2}$ and $q_1$ and $q_2$ are the signed magnitudes of the charges, the scalar r is the distance between the charges, the vector $r_{21} = r_1 - r_2$ is the vector distance between the charges, and $$r^{21} = \frac{r_{21}}{|r_{21}|} \text{ (a unit vector pointing from } q_2 \text{ to } q_1\text{)}. \qquad \text{Equation 3}$$

For example, as shown in FIG. 4, if $q_2$ represents a point charge of an input from a sensor (e.g., a depth sensor) corresponding to a coordinate from a point cloud associated with a real world element, and $q_1$ is a point charge associated with the virtual object, then the vector form of the equation calculates the force $F_1$ applied on $q_1$ by $q_2$. The determined force can be applied to the virtual object according to one or more properties associated with the virtual object. In one implementation, a derivative of Coulomb's law is applied to simplify the computation of force applied to a virtual object. For example, the constant $k_e$ and $q_1$ can be replaced by a single constant K, if the point charges on the primitive are constant at that instance, which is given by:

$$|F_1| = K \frac{q_2}{|r_{21}|^2} r^{21} \qquad \text{Equation 4}$$

Furthermore, other force mapping functions can be used to compute force applied to a virtual object—for example, to create a different behavior resulting from the force interaction. For example, the distance may be mapped to the force computation using a reciprocal function (e.g., F $\alpha$ 1/r$^4$) to obtain a faster rate of force application (e.g., when a faster response time is desired form a force interaction).

(b) Use of Primitives by the Physics System Management Component 150

Returning to FIG. 1, in some implementations, the physics system management component 150 may access a data file in the primitive datastore 130 that contains primitives corresponding to virtual objects and/or virtual objects. Virtual objects may be expressed as one or more primitives. The data file may store one or more primitives, coordinates, assigned content and/or graphics corresponding to virtual objects modeled in the 3D virtual environment. In one example, primitives may be thought of building blocks of virtual objects in the 3D virtual world. Primitives include a number of parameters, which may be assigned according to the properties desired for the corresponding virtual object. For example, parameters may include at least a type, a charge, a field, a size, one or more constraints, and coordinates. A charge combined with a field describes an interactive volume of a virtual object.

A primitive's "type," as used herein, may include an identifier (ID) specifying the geometry of the primitive.

Types of primitives include a point, a line or a line segment, a plane (or subset of a plane with a boundary condition, such as a circle or rectangle), an ellipsoid (e.g., a sphere), a cylinder, and a torus, which are described in more detail below. The geometric models may be specified by piecewise parametric equations corresponding to a shape and/or a size of the primitive.

In some implementations, the charge parameter of a primitive may be positive, negative, or no charge (e.g., 0)) and have a magnitude (e.g., 0<q<100). If the charge of the virtual object is the same as the charge associated with a point from a sensor input, then the force applied by the sensor input on the virtual object may be repellant, and if the charge of the virtual object is the opposite to the charge associated with a point from a sensor input, then the force applied by the sensor input on the virtual object may be attractive, for instance. In some implementations, a primitive may have multiple charges.

A "field" of the primitive, as used herein, may define an interactive boundary, or area of interactivity, of the primitive within the virtual environment. When the field is combined with a charge, it may define an "interactive volume" that specifies interaction with translated real world objects. In one example, the field parameter (e.g., 0 cm<$d_f$<=10 cm) is a distance d measured by a line segment of length d orthogonal to the core of the primitive at which, when coordinates of a sensor input are determined to be within it, the primitive becomes interactive (e.g., responds to forces acting on the primitive according to a charge associated with the field). Alternatively, the distance $d_f$ may be measured as a line segment of length d orthogonal to a core associated with the virtual object. When coordinates of a sensor input are determined to be within the boundary defined by the parameter, virtual object becomes active or interactive and is capable of responding in a defined manner to the sensor input (e.g., responsive to the application of force from the sensor input according to a charge associated with the field).

A primitive may have multiple interactive volumes. In some implementations, a primitive has at least two interactive volumes. For example, a primitive may have a first charge (e.g., zero charge) that is applied from the core to a first field distance, and a second charge (e.g., a positive or negative charge) that is applied between the first field distance and a second field distance. To continue the example, from the core to a first distance (e.g., 0 cm<=$d_{fcore}$<=5 cm), the primitive can have a zero charge to generate a neutral interactive volume. Within the neutral interactive volume, no forces are applied to the virtual object associated with the primitive, and thus no force computation is performed. In some implementations, providing a neutral interactive volume around the core of a primitive prevents an infinite amount of force from being applied to the primitive and its related virtual object; for example, at an instance due to an attempt to divide by zero during a force calculation, which can result in unwanted manipulation of a virtual object. In an example, the neutral interactive volume may be roughly correlated to the visual size or portion of the rendering of a virtual object as it appears to a user. In addition, from the first distance to the second distance (e.g., 5 cm<$d_{fforce}$<=10 cm), the field has a charge (e.g., positive or negative) that creates a repellant interactive volume (e.g., charge of field is same as charge associated with a sensor input) or an attractive interactive volume (e.g., charge of field is opposite to a charge associated with a sensor input) that governs the way that applied force (as defined by the sensor input) acts on the primitive. Beyond the second distance, the primitive is inactive. Examples of these interactive volumes are shown in conjunction with the primitives illustrated in FIGS. 5A, 5B, 5C, 5D, 5E, and 5F.

Figure 5A:
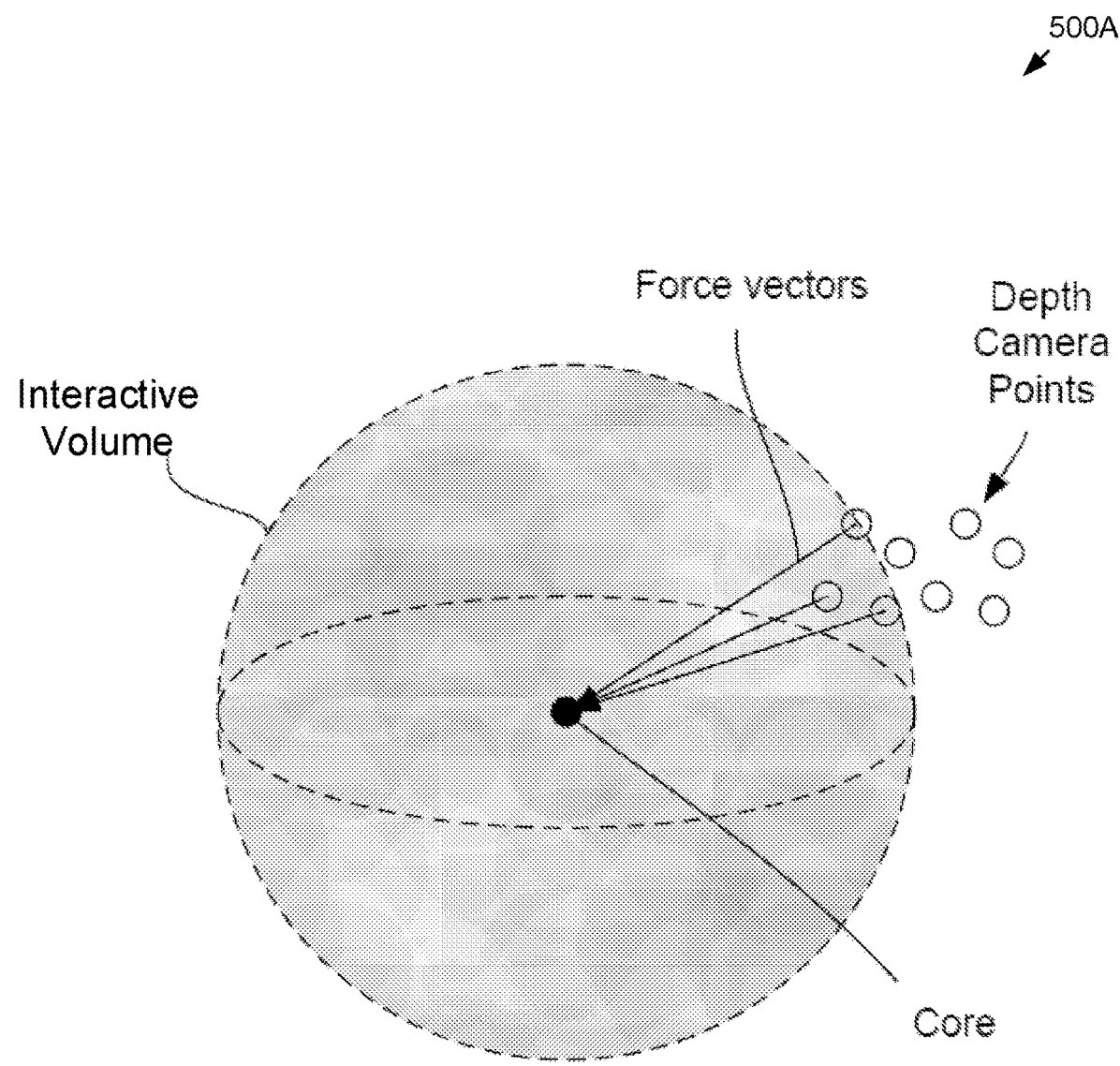
FIGS. 5A, 5B, 5C, 5D, 5E, and 5F show examples of primitives that may be used to build virtual objects, in accordance with one or more implementations.
Figure 5B:
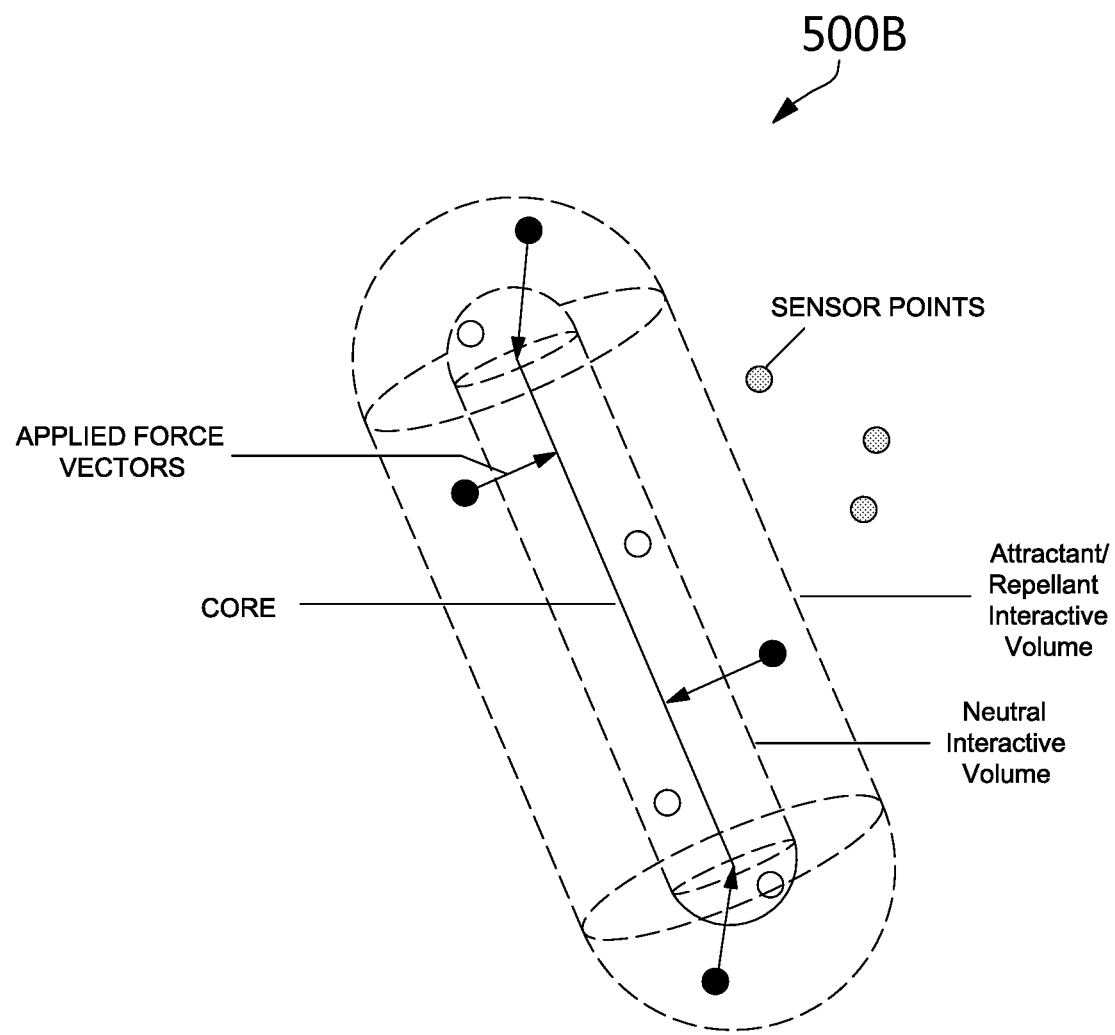
Figure 5C:
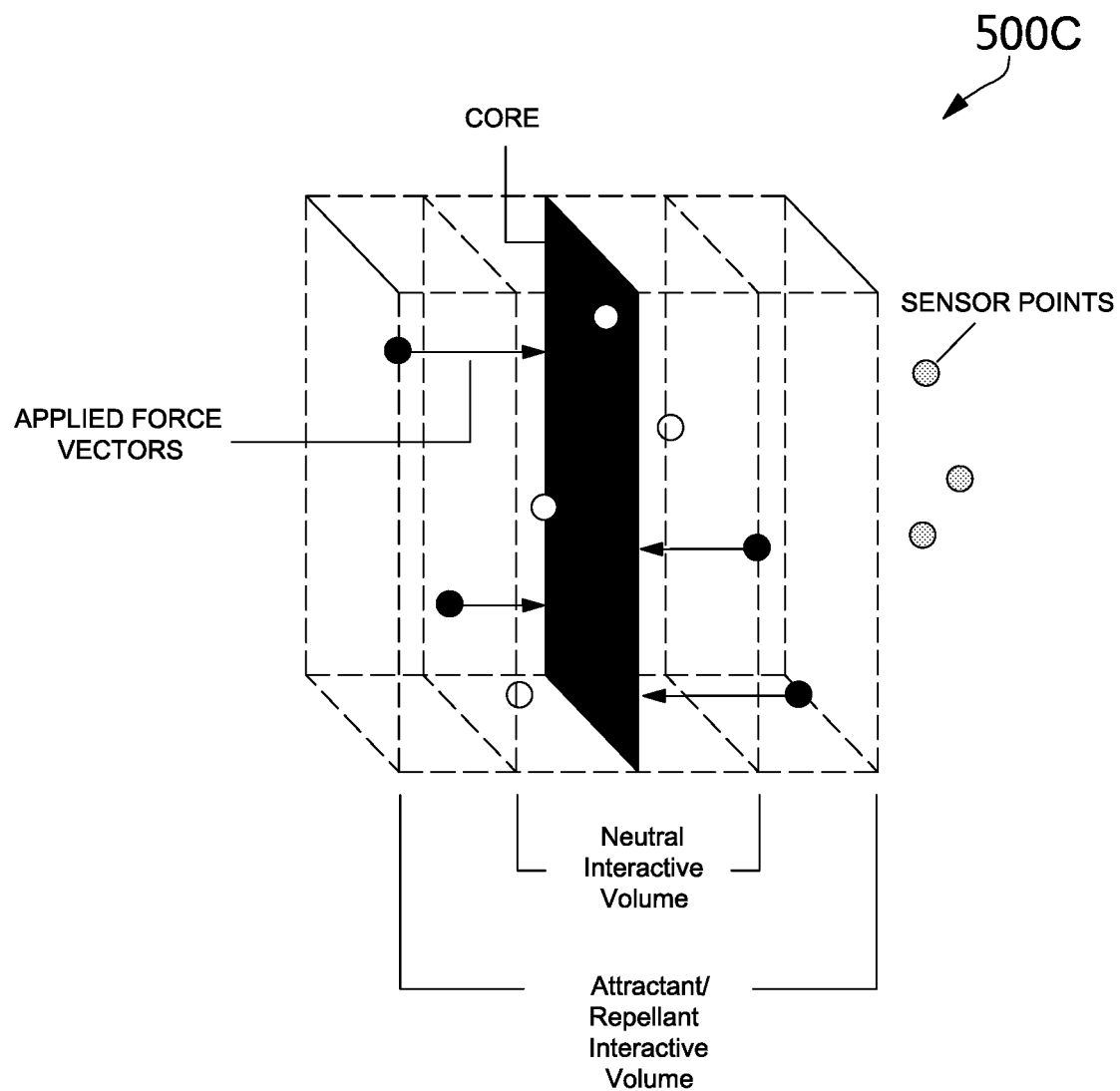
Figure 5D:
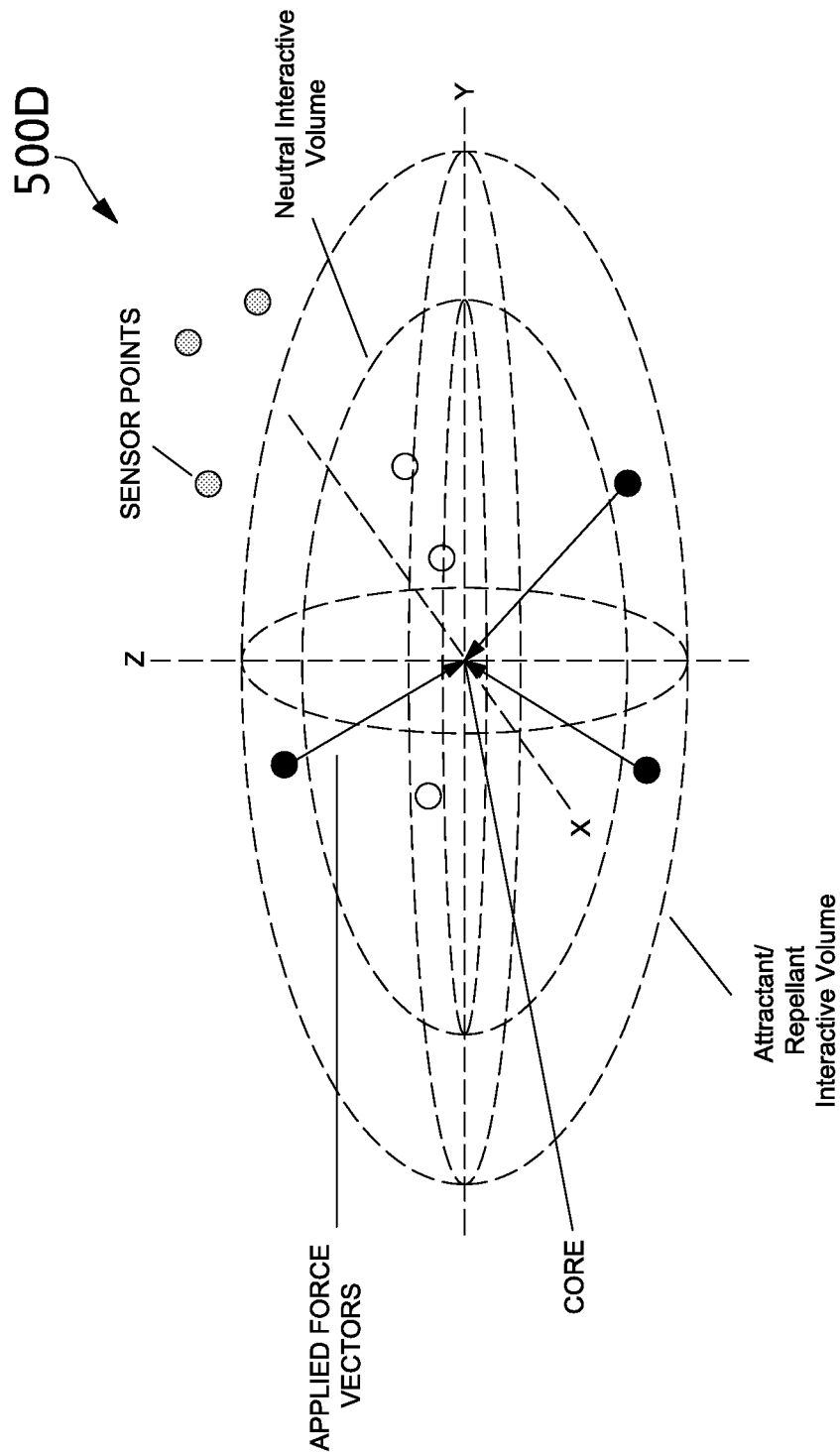
Figure 5E:
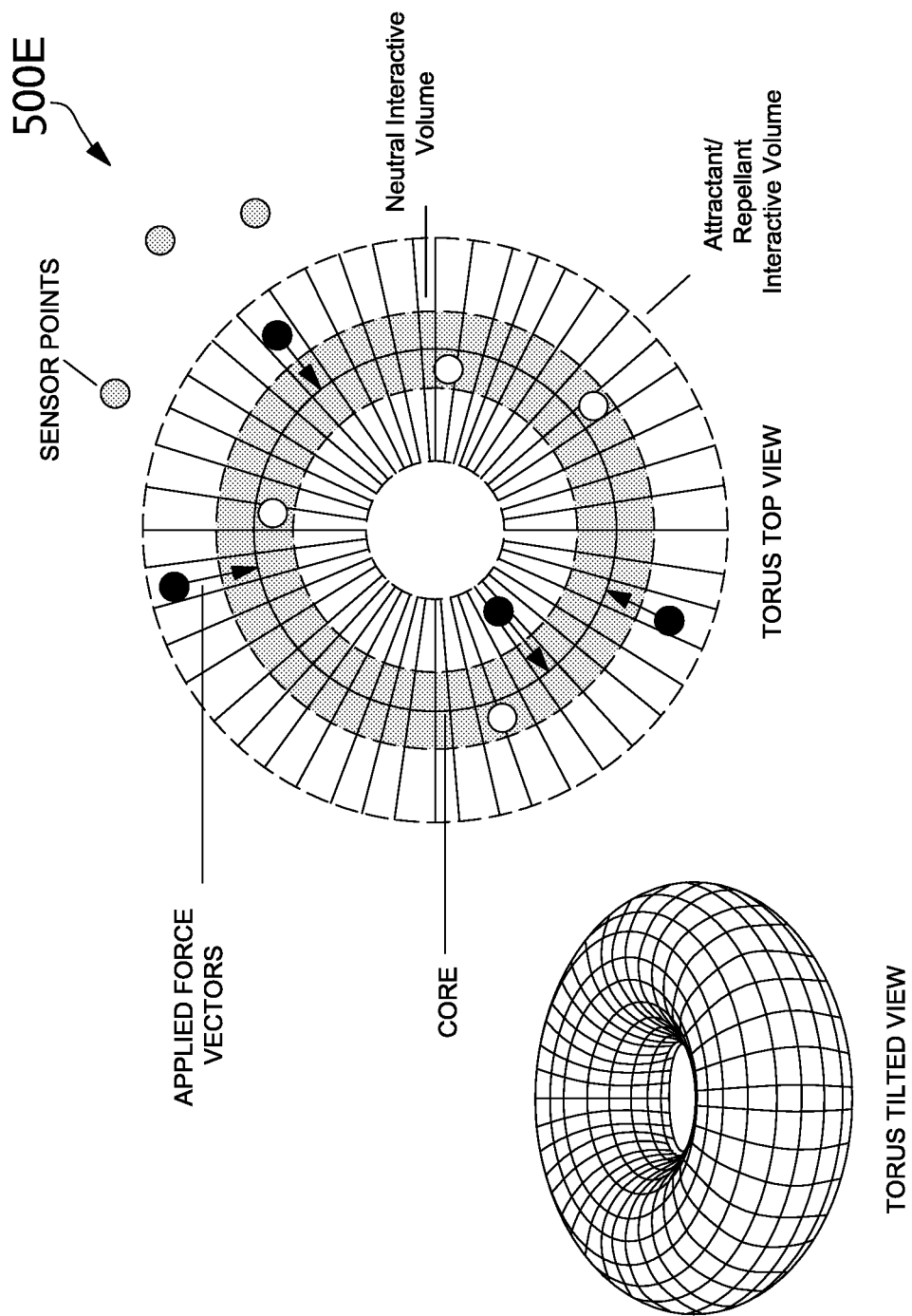
Figure 5F:
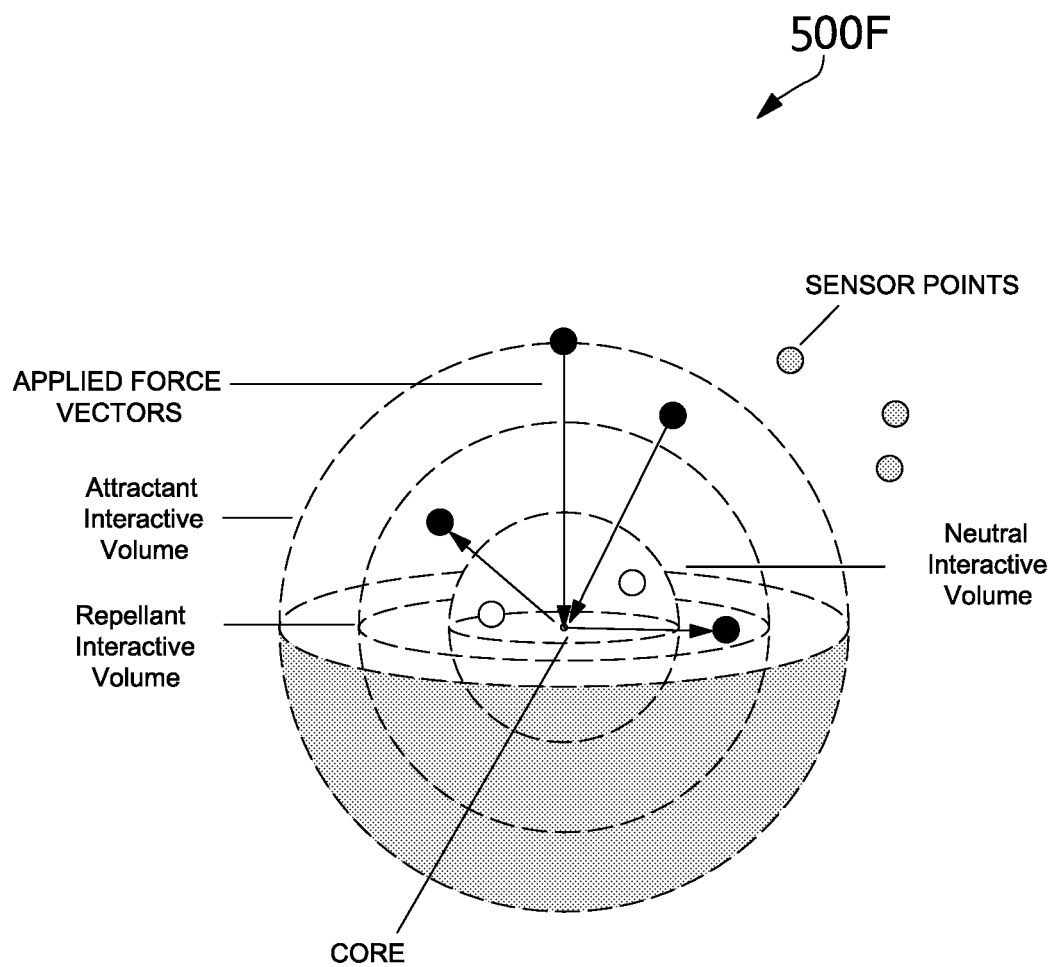

In some implementations, a primitive has three interactive volumes: an inner neutral interactive volume, an intermediate repellant interactive volume, and a third outer attractive interactive volume. In this example, the combination of interactive volumes allows a virtual object to be moved and "held" in space as the attraction and repellent forces balance in an equilibrium state (e.g., the force of repulsion is substantially equal to the force of attraction at a specified distance from the core). An example of a primitive with three interactive volumes configured in this fashion is shown in FIG. 5F. For example, assume a primitive has neutral interactive volume (e.g., 0 cm<=$d_{fcore}$<=5 cm, charge=zero), a repellant interactive volume (e.g., 5 cm<$d_{frepel}$<=10 cm charge=positive), and an attractive interactive volume (e.g., 10 cm<$d_{fattract}$<=20 cm charge=negative), and a sensor input has a positive charge. As a sensor input coordinates move within a distance of 20 cm of the primitive, the primitive experiences an attractive force and moves toward the sensor input. As long as the sensor input maintains a distance (e.g., 10 cm<$d_{sensorinput}$<=20 cm), the primitive continues to be attracted or move towards the sensor input. If the sensor input remains in place over time, the primitive continues to be attracted and moves towards the coordinates of the sensor input until the distance from the core of the primitive reaches 10 cm. At this point, the object stops, as the attractive force generated by the attractive interactive volume equals the repellant force generated by the repellant interactive volume. In this sense, a virtual object is held in the virtual space. If the sensor input coordinates move within 10 cm, the primitive experiences a repellant force and movers away from the coordinates of the sensor input, giving the primitive the appearance of body or substance to the user. As long as the sensor input maintains a distance (e.g., 5 cm<$d_{sensorinput}$<=10 cm), the primitive continues to be repelled and moves away from the sensor input. If the sensor input moves within 5 cm no force is applied to the primitive, for example, to prevent unwanted force calculations and/or virtual object manipulation.

For example, if points from a depth camera related to the sensor(s) 120 correspond to a user's hand and the primitive described in the previous paragraph (e.g., the discussion related to FIG. 5F) is incorporated into a virtual object in a virtual 3D space, the user may reach towards the virtual object, breaking the outer interactive volume of an associated primitive, and causing the virtual object to be attracted to the user's hand to the point of equilibrium between the attractive and repellent interactive volumes associated with the primitive (i.e., until it is within 10 cm of the translated coordinates of the user's hand), at which point the virtual object will come to rest. If the translated coordinates of the user's hand maintain this distance relative to the virtual object, the virtual object moves with the translated hand as long as this distance is maintained. In this manner, a user may "hold" the element. For example, when in this "hold" position, if the user's hand moves closer to the virtual object, the virtual object will move away of the user's hand, seemingly responding to the movement of the user's hand as it appears to hold the virtual object. Conversely, if the user moves his or her hand away from the virtual object with sufficient velocity, the sensor points representing the user's hand will leave the attractive interactive volume around the virtual object, and the hand will appear to release or shake off its hold of the virtual object.

In an example, a virtual object may be held using two forces (e.g., a neutral interactive volume surrounded by an attractive interactive volume) in a similar manner; however, in this instance, the virtual object can be penetrated (e.g., as there is no repellant interactive volume).

Visual parameters of the primitive may be used to define the visual properties of the primitive. For example, a size, color, and a texture parameter may be provided and used in rendering of the primitive in the virtual 3D space. In addition, a link, identifier, or pointer may be used to associate and/or map virtual content to the primitive. For example, graphics of a web page may be mapped to a panel primitive simulating a virtual 3D multi-touch pad, while allowing user interactions—including a click or other gesture—as inputs on a virtual web panel.

"Constraints" of the primitive can be used to define how the primitive responds to forces exerted on the primitive when the primitive is active. For example, a force vector and a constraint (among other parameters) may be input to a physics engine or other logic program to simulate the dynamics of the virtual 3D environment and to determine a response of the primitive to the application of the force. Examples of constraint parameters may include: drag, angular drag, mass, and center of mass, and trajectory. Drag is the force exerted in the direction opposite to the translation velocity of a primitive (e.g., 0<dragx<1, 0<dragy<1, 0<dragz<1). Angular drag is the force applied in the direction opposite to the rotational velocity of a primitive (e.g., 0<dragangular<1). Mass is the resistance of the primitive to being accelerated by a force applied to the primitive. In one example, the mass of a virtual object in the 3D virtual space may be 0.1 kg<mass<10 kg; however, other amounts and units of measurement may be used. Center of mass is the point (e.g., cm=(x, y, z)) of the primitive where a force may be applied causing the primitive to move in the direction of the applied force without rotation. Trajectory is a predefined path an object can travel in a 3D virtual space, and it constrains the possible movement of the 3D virtual object (e.g., moving on a curve). In addition, the primitive has coordinates (e.g., $p_1$=(x, y, z)) associated therewith to define its position in a virtual space and where the primitive is rendered for display.

(c) Interactive Volumes and Interactivity by Physics System Management Component 150

Returning to FIG. 1, in some implementations, the physics system management component 150 implements interactive volumes and/or interactivity. As discussed herein, primitives can be assigned an interaction volume that forms an interactive boundary that is used to determine whether—and under what circumstances—a primitive is interactive (e.g., the primitive may respond to a force based on its associated properties). For example, the interaction volume can be expressed by at least one distance parameter $d_f$ and an associated charge. The distance defines a boundary formed around the primitive at the distance $d_f$ measured orthogonally from the core of a primitive. In another example, the interaction volume can be expressed by multiple boundaries $d_{inner}$ and $d_{outer}$ (e.g., $d_{inner} < d_f \leq d_{outer}$) measured orthogonally from the core of a primitive and a charge. Examples of interaction volumes in relation to various sensor input points are illustrated in FIGS. 5A, 5B, 5C, 5D, 5E, and 5F for the various primitive types. When one or more sensor inputs (e.g., coordinates of a point from the point cloud associated with a real world element) are within the boundary defined by the interaction volume, the primitive becomes interactive and force may be applied to the primitive. Thus, in one example, the interaction volume boundary can reduce the computational burden associated with processing of virtual objects in a virtual 3D space by only determining forces and/or other computations associated with virtual object that is within range of a point cloud. As a result, any point cloud that is not within the boundary of the interaction volume is not involved in any computation associated with the virtual objects.

Figure 6:
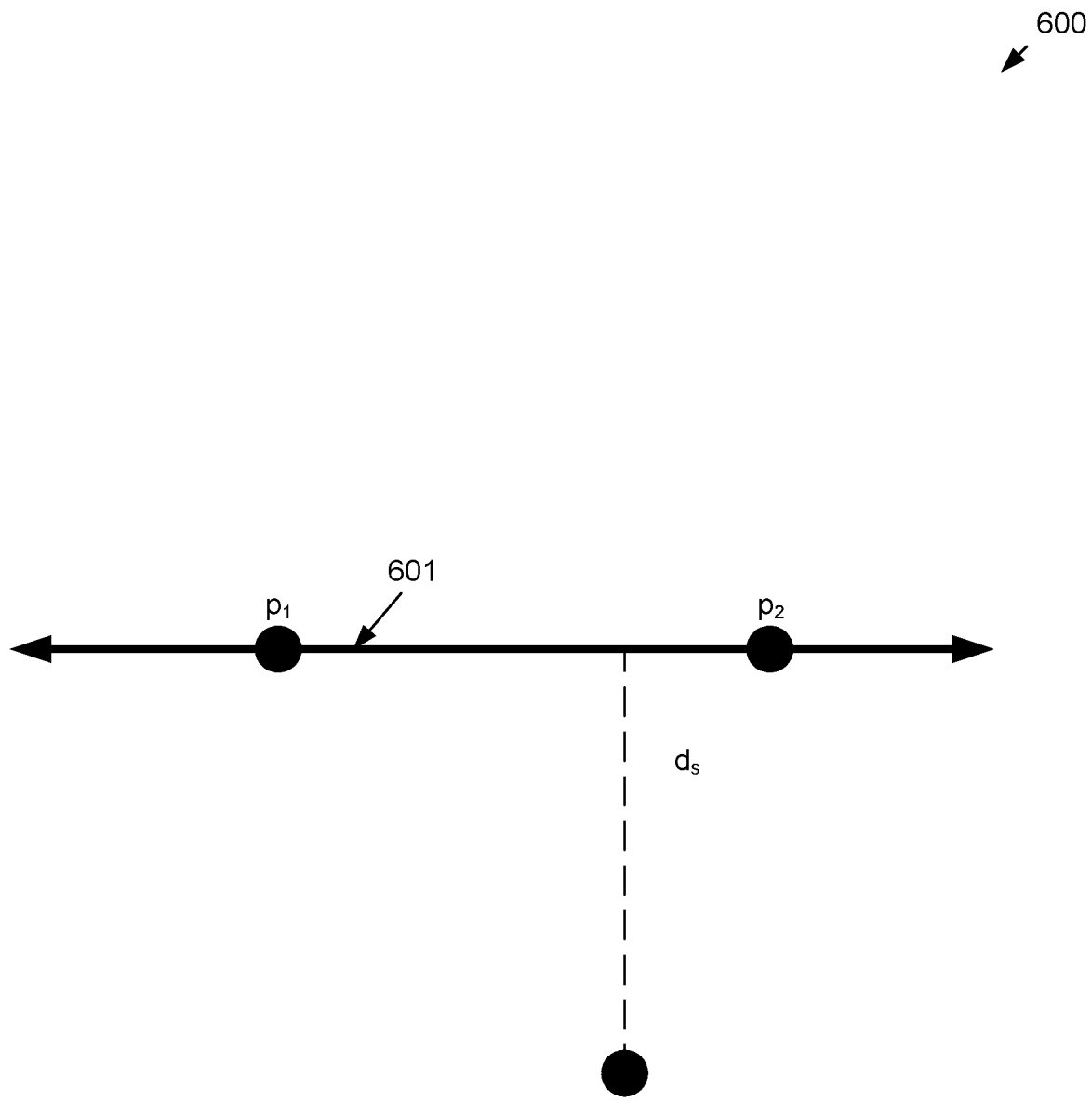
FIG. 6 illustrates an example of a boundary of an interactive volume of a primitive, in accordance with one or more implementations.

FIG. 6 illustrates an example 600 of a boundary of an interactive volume of a primitive, in accordance with one or more implementations. Included in FIG. 4 is a primitive 601. In this example, the primitive 401 may be interactive when the distance ds, corresponding to the length of a straight line segment orthogonal to a point on the core of the primitive extending from the point on the core to the coordinates of the point associated with an input from a sensor, is less than $d_f$. FIG. 6 illustrates one example of this determination for a line primitive. As shown in FIG. 6, a line primitive is expressed by two points $p_1$ ($x_1$, $y_1$, $z_1$) and $p_2$ ($x_1$, $y_1$, $z_1$) on the line segment 301. $p_{input}$ ($x_{input}$, $y_{input}$, $z_{input}$) represents the input point from a sensor corresponding to a real world object. The shortest distance $d_s$ from $p_{input}$ to the line segment may be determined as:

$$d_s = \frac{|(p_{input} - p_1) \times ((p_{input} - p_2)|}{|p_2 - p_1|} \qquad \text{Equation 5}$$

In this example, if $d_s < d_f$, then primitive 401 may be interactive (d) Virtual Object Manipulation by Physics System Management Component 150

Figure 7:
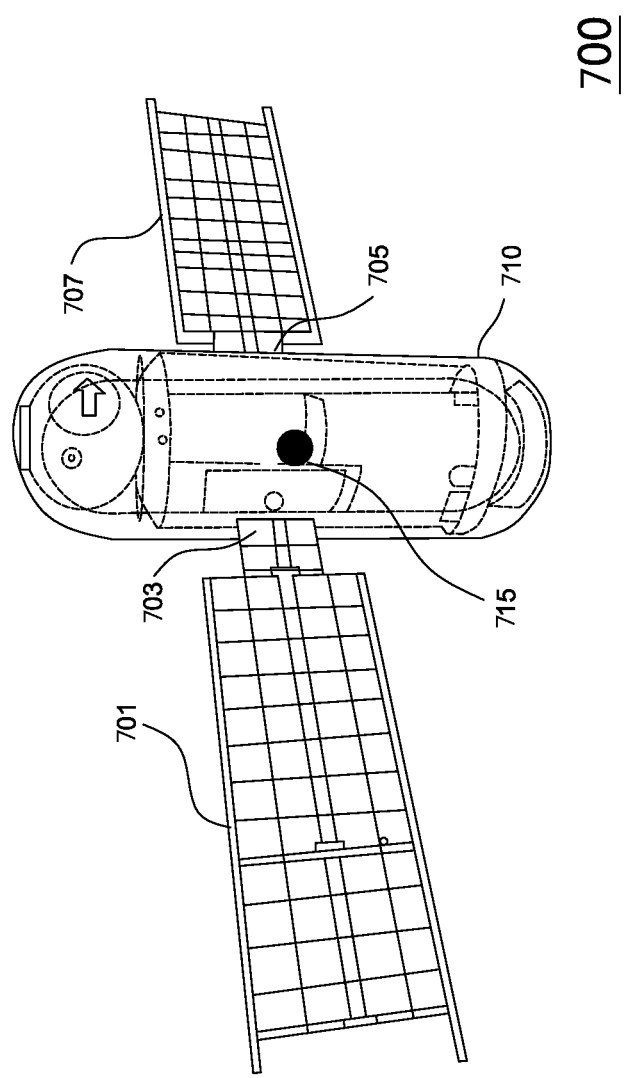
FIG. 7 illustrates an example of application of one or more primitives to content, in accordance with one or more implementations.

Returning to FIG. 1, in some implementations, the physics system management component 150 allows virtual objects to be manipulated. The manipulation of virtual objects may, but need not, depend on interactive force determinations, properties of primitives, and/or interactive volumes/interactivity discussed further herein. As an example, FIG. 7 illustrates an example 700 of the application of primitives to define content in a virtual 3D space and therefore make the content interactive (according to the parameters assigned to any underlying primitive associated with the content). In one example, content of a graphics data file includes data to render virtual 3D graphics depicting a satellite telescope in a virtual 3D space. In order to make the content interactive in the virtual space, one or more primitives are associated with the content. In one example, primitives may be utilized in a modular fashion to emulate the perceived shape of the content and to make content interactive in the virtual world. For example, four plane primitives 701, 703, 705, 707 and a cylinder primitive 710 are mapped to the content of the graphics file to create a virtual object with a center of mass 715. Together, the primitive and the graphics content create a rigid body, in which the rotation and translations of the body are coupled.

Figure 8B:
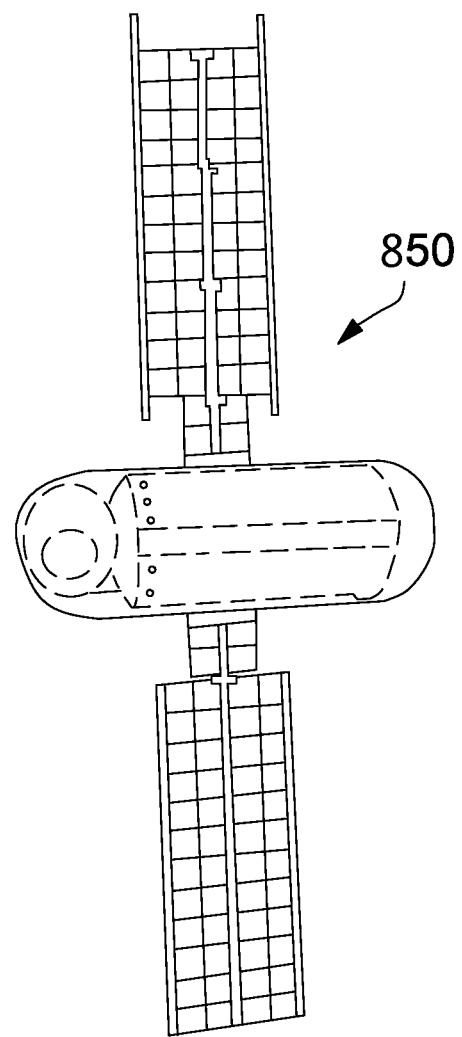

FIG. 8A illustrates an example 800 of the rendering of the virtual object of FIG. 7 (e.g., a satellite telescope) including a visual representation of point cloud 801 derived from sensor input (e.g., depth coordinates of a hand and/or stylus of user). FIG. 8A shows a first orientation 800 of the satellite telescope. Force vectors 810 are illustrated as lines extending from the hand to an edge 816 of the plane primitives 707. As the point cloud of the user's hand moves towards the edge of the plane primitives 707, a force is applied to the edge causing the plane primitives 701, 703 705, 707, and 710 and the associated content to rotate about the center of mass 716 to a new orientation 850 in the virtual space, as shown in FIG. 8B. One skilled in the art will appreciate that the illustration of the force vectors 810 as white lines is shown in FIG. 8A to aid understanding of the implementation of FIGS. 7, 8A, and 8B, and actual rendering of a virtual 3D space does not require graphic depiction of the force (much in the way force is not seen in the real world), unless depicting the force is desired in any particular application (e.g., a user tutorial on how to interact with a virtual environment). Similarly, the point cloud 801 corresponding to the sensor input does not have to be rendered or depicted unless desired. For example, in an augmented reality application, the point cloud may not be illustrated; the hand of a user may be directly viewed within the rendered virtual space interacting with the virtual objects. In another example, in a virtual reality application, the point cloud or some other visualization associated therewith can be rendered in the virtual space to aid the user in controlling, manipulating, and interacting with virtual object to show a corresponding location of the real world element and translated into the virtual world in relation to the virtual objects.

2. User Interaction Datastore 128, Primitive Datastore 130, Virtual Object Datastore 132, and Virtual Action Datastore 134

The user interaction datastore 128, the primitive datastore 130, the virtual object datastore 132, and the virtual action datastore 134 may comprise electronic storage media that electronically stores information. The electronic storage media may include one or both of system storage that is provided integrally (i.e., substantially non-removable) with display system 104 and/or removable storage that is removably connectable to the display system 104 via, for example, a port (e.g., a USB port, a firewire port, etc.) or a drive (e.g., a disk drive, etc.). The user interaction datastore 128, the primitive datastore 130, the virtual object datastore 132, and the virtual action datastore 134 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage media may include one or more virtual storage resources (e.g., cloud storage, a virtual private network, and/or other virtual storage resources). The electronic storage media may store software algorithms, information determined by processor(s) 127, information received from the display system 104, and/or other information that enables the display system 104 to function as described herein.

In some implementations, user interaction datastore 128 may be configured to store user interaction data. The primitive datastore 130 may be configured to store primitives. The virtual object datastore 132 may be configured to store virtual objects. The virtual action datastore 134 may be configured to store tables of how physical movements correspond to virtual actions in the three-dimensional virtual environment.

II. Example Operation of Virtual Environment Control System 100

Figure 2A:
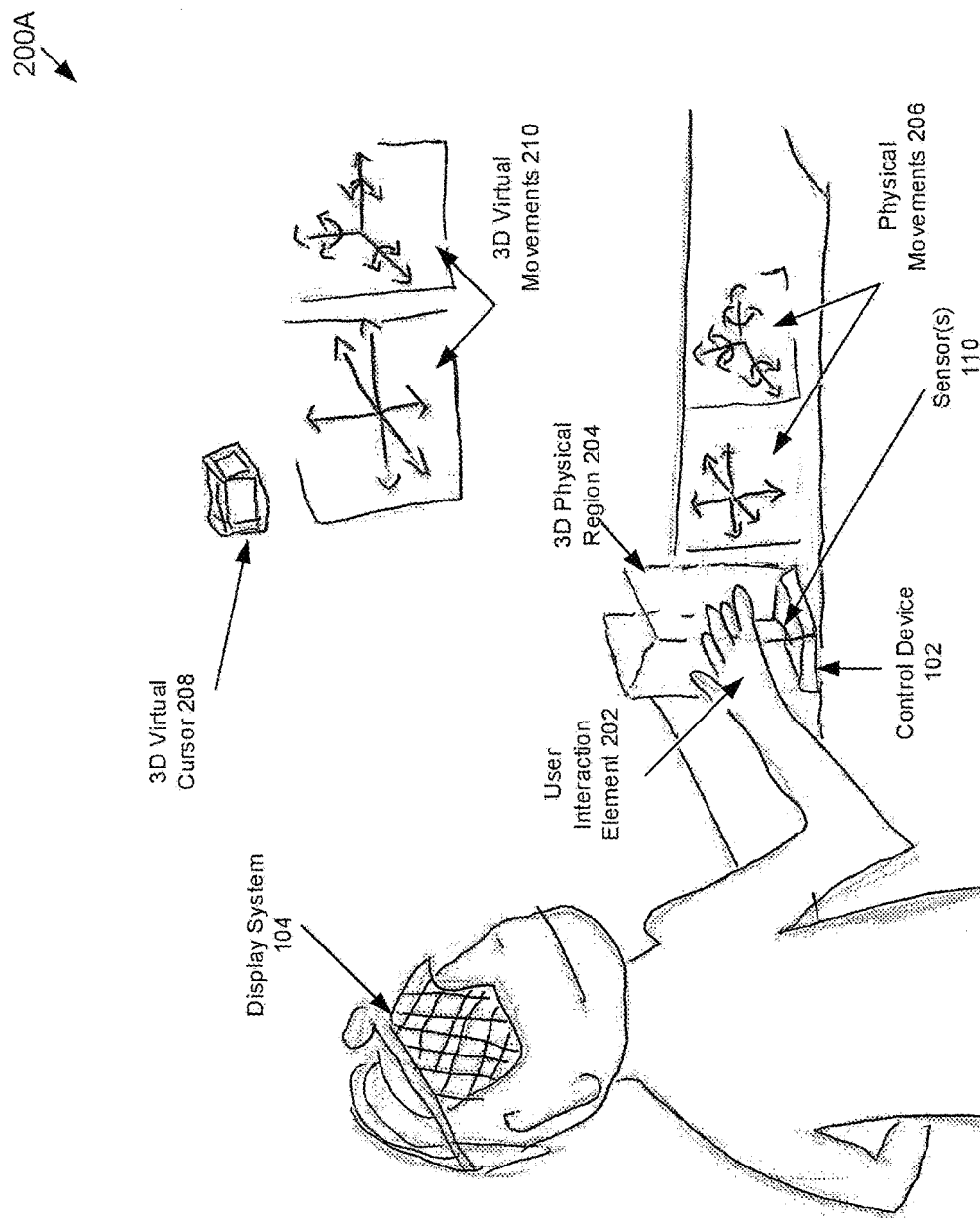
FIG. 2A illustrates an example system environment of a virtual environment control system for controlling a three-dimensional virtual environment, in accordance with some implementations.

In various implementations, the virtual environment control system 100 may operate to control a three-dimensional virtual environment displayed on the display system 104 using physical movements of a user interaction element sensed by the sensor(s) 110 of the control device 102. Turning to FIG. 2A, the figure illustrates an example system environment 200 of a virtual environment control system for controlling a three-dimensional virtual environment, in accordance with some implementations. The system environment 200 includes the control device 102 having the sensor(s) 110 and the display system 104. The system environment 200 further includes a user interaction element 202, a three-dimensional physical region 204, illustrations corresponding to physical movements 206, a three-dimensional virtual cursor 208, and illustrations corresponding to three-dimensional virtual movements 210.

In some implementations, the control device 102 is configured by the display system 104 or other relevant module to provide sensor data when the user interaction element 202 is within the three-dimensional physical region 204. The three-dimensional physical region 204 may comprise a length dimension, a width dimension, and a height dimension corresponding to a physical zone of a three-dimensional trackpad established by the control device 102. The sensor(s) 110 may track one or more of the physical movements 206, which may comprise translations in horizontal, vertical, or depth directions. The physical movements 206 may also comprise rotations along horizontal, vertical, or depth axes. The control device 102 may provide sensor data or other data related to the physical movements 206 to the display system 104. The display system 104 may translate the physical movements 206 to three-dimensional virtual interactions (shown in FIG. 2A as three-dimensional virtual movements 210) with virtual objects (e.g., a three-dimensional virtual cursor 208) and/or a three-dimensional virtual environment. The three-dimensional virtual cursor 208 may be moved according to virtual actions based on these user interactions.

Figure 2B:
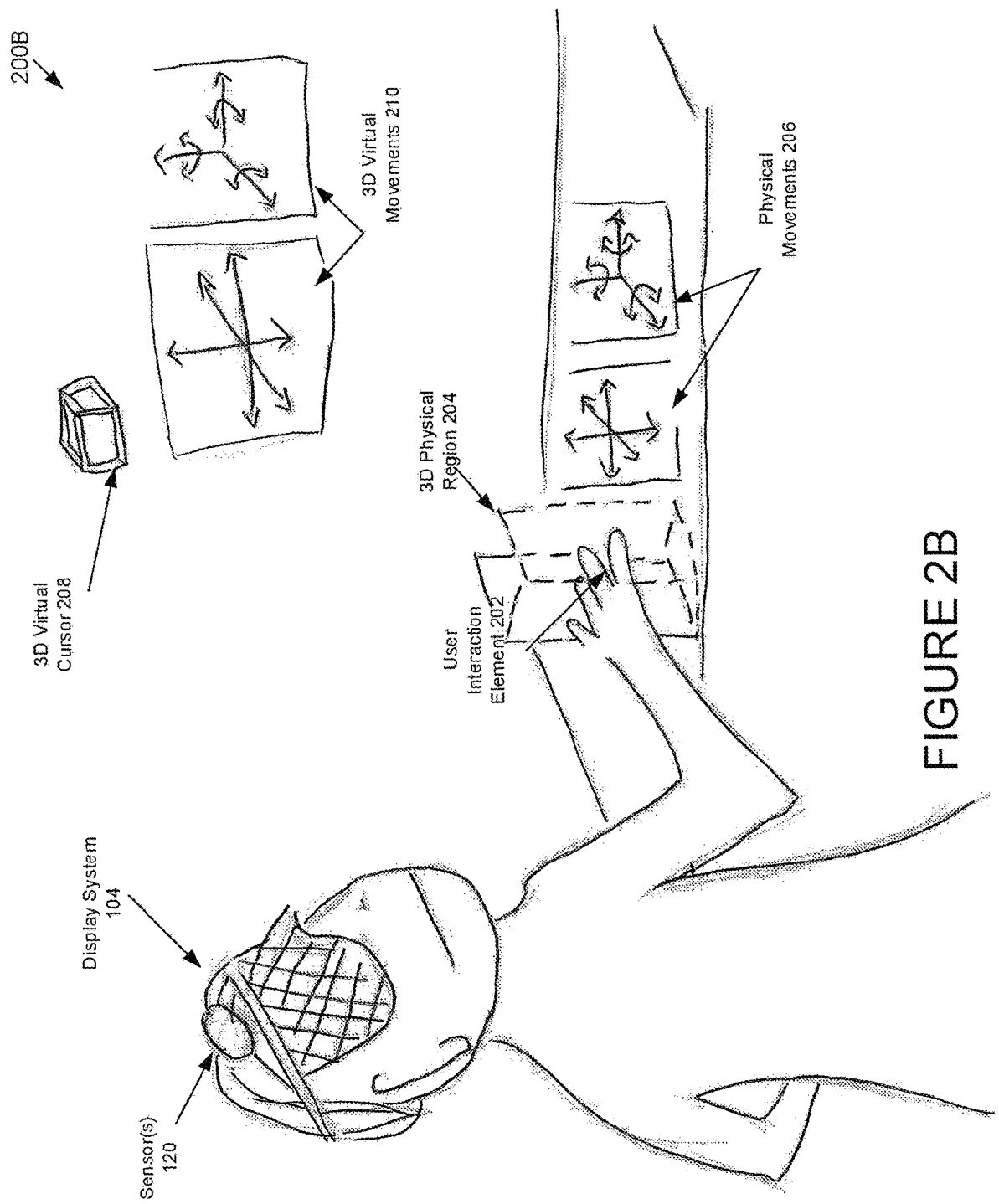
FIG. 2B illustrates an example system environment of a virtual environment control system for controlling a three-dimensional virtual environment, in accordance with some implementations.

Turning to FIG. 2B, the figure illustrates an example system environment 200 of a virtual environment control system for controlling a three-dimensional virtual environment, in accordance with some implementations. The system environment 200 includes the display system 104 having the sensor(s) 120. The system environment 200 further includes a user interaction element 202, a three-dimensional physical region 204, illustrations corresponding to physical movements 206, a three-dimensional virtual cursor 208, and illustrations corresponding to three-dimensional virtual movements 210.

In some implementations, the sensor(s) 120 of the display system 104 are configured to provide sensor data when the user interaction element 202 is within the three-dimensional physical region 204. The three-dimensional physical region 204 may comprise a length dimension, a width dimension, and a height dimension corresponding to a physical zone of a three-dimensional trackpad established by the display system 104. in some implementations, the three-dimensional physical region may correspond to an area likely to include the user interaction element 202 when a user is in an ergonomic setup. The sensor(s) 120 may track one or more of the physical movements 206, which may comprise translations in horizontal, vertical, or depth directions. The physical movements 206 may also comprise rotations along horizontal, vertical, or depth axes. The sensor(s) 120 provide sensor data or other data related to the physical movements 206 to other modules of the display system 104. The modules of the display system 104 may translate the physical movements 206 to three-dimensional virtual interactions (shown in FIG. 2B as three-dimensional virtual movements 210).

Figure 3:
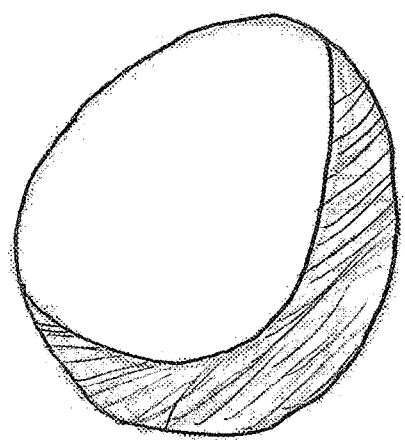
FIG. 3 illustrates a plurality of three-dimensional virtual cursors for a three-dimensional virtual environment, according to some implementations.
Figure 3:
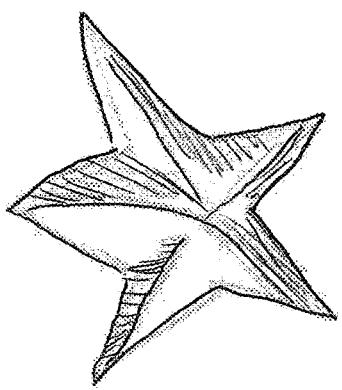
Figure 3:
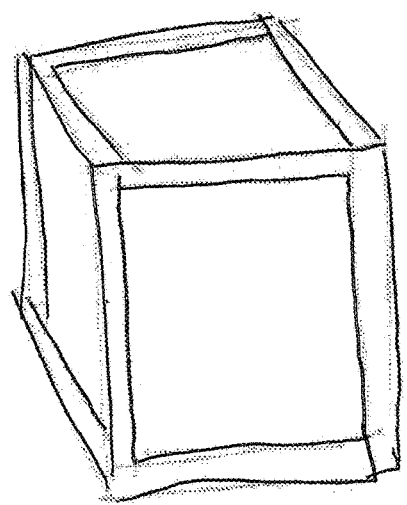

Though FIG. 2A and FIG. 2B show the three-dimensional virtual cursor 208 as a virtual cube, it is noted the three-dimensional virtual cursor 208 may include any shape. As an example, FIG. 3 illustrates a plurality of three-dimensional virtual cursors 208a, 208b, and 208c for a three-dimensional virtual environment, according to some implementations. The three-dimensional virtual cursors 208a may comprise a virtual cube. The three-dimensional virtual cursors 208b may comprise a virtual sphere. The three-dimensional virtual cursors 208c may comprise a virtual star.

III. Flowcharts of Example Methods of Operation

Flowcharts of example methods of operation of the virtual environment control system 100 shown in FIG. 1 and further discussed in the context of FIGS. 2-8B are now presented herein. The operations of the methods of operation presented below are intended to be illustrative. In some implementations, methods may be accomplished with one or more additional operations not described, and/or without one or more of the operations discussed. Additionally, the order in which the operations of methods are illustrated in the figures and described below is not intended to be limiting.

Figure 9:
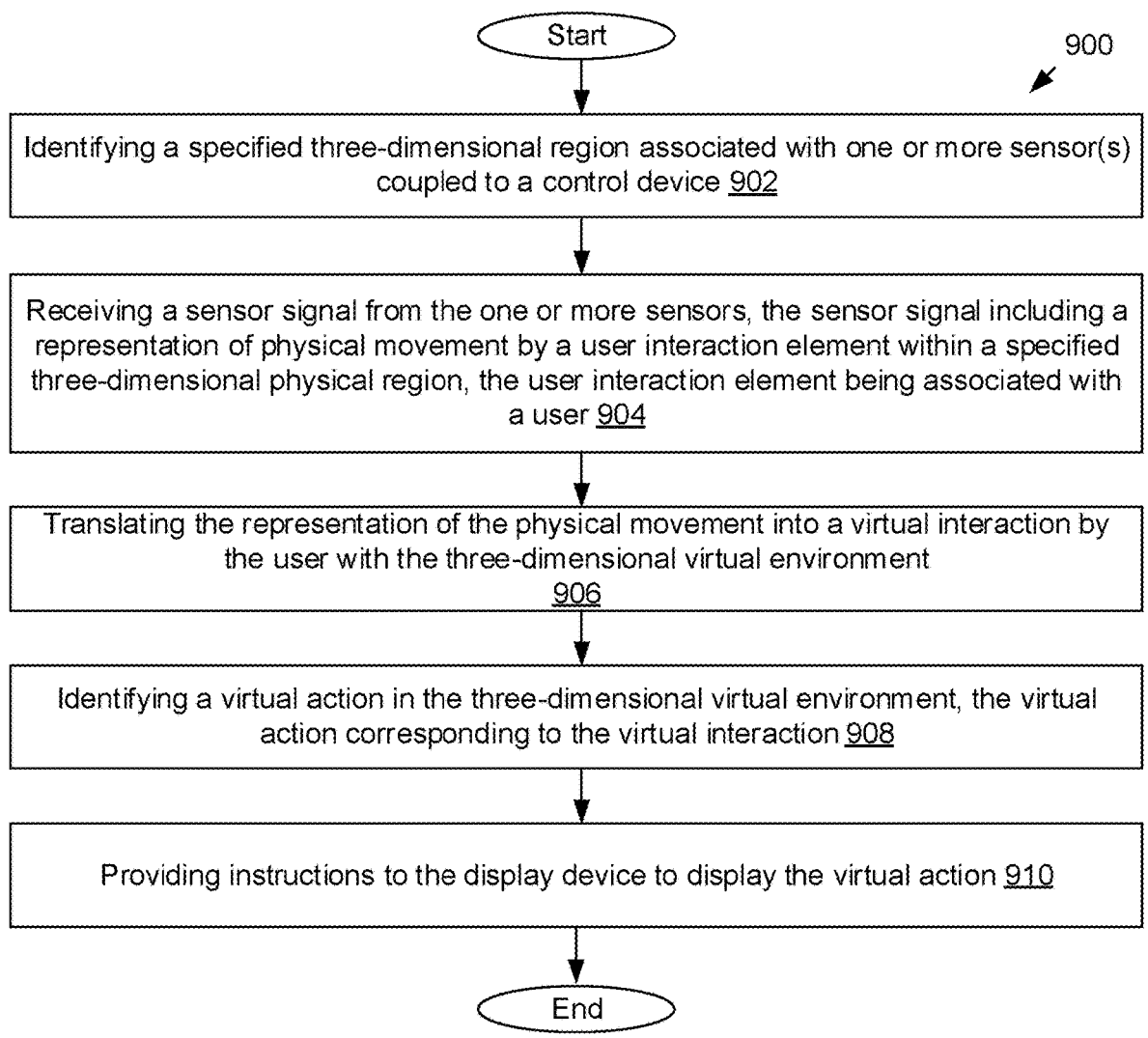
FIG. 9 is a flowchart showing an example of a process for taking a virtual action in a three-dimensional virtual environment in response to physical movement in a three-dimensional physical region associated with sensor(s) coupled to a control device, in accordance with one or more implementations.

FIG. 9 is a flowchart showing an example of a process 900 for taking a virtual action in a three-dimensional virtual environment in response to physical movement in a three-dimensional physical region associated with sensor(s) coupled to a control device, in accordance with one or more implementations. The process 900 may be implemented by the control device 102 and/or the display system 104, shown in FIG. 1 and discussed further herein. The process 900 may be used to allow a user to control a three-dimensional virtual environment from the control device 102.

At an operation 902, a specified three-dimensional region associated with one or more sensor(s) coupled to a control device may be identified. In various implementations, the control device management component 144 may define a specified three-dimensional physical region around the sensor(s) 110 of the control device 102 and/or sensed by the sensor(s) 120 of the display system 104. The specified three-dimensional physical region may be characterized by a region around the control device 102 that a user may use to interact with a three-dimensional virtual environment displayed by the display system 104. The specified three-dimensional physical region may correspond to a region a user of the control device 102 may use as part of an ergonomic setup, such as a portion of a seated or standing desk. In some implementations, the specified three-dimensional physical region may reside approximately where a user of the three-dimensional virtual environment would place a trackpad, a mouse, or other input device. The control device management component 144 may provide the sensor management component 118 and/or the sensor management component 140 with information to instruct the sensor(s) 110 and/or the sensor(s) 120 to sense physical movements within the specified three-dimensional physical region.

At an operation 904, a sensor signal may be received from one or more sensors. The sensor signal may include a representation of physical movement by a user interaction element within the specified three-dimensional physical region. The user interaction element may be associated with a user. In various implementations, the sensor signal may include a representation of translations, rotations, etc. of a user's hand, stylus, attached physical object, or other user interaction element. In various implementations, camera(s) that form a part of the sensor(s) 110 and/or the sensor(s) 120 may capture still and/or moving images of the user interaction element as it physically moves. Depth sensors that form a part of the sensor(s) and/or the sensor(s) 120 110 may capture distances of the user interaction element as it physically moves. The sensor management component 118 and/or the sensor management component 140 may gather the sensor signal and provide a representation of the physical movement to the control device management component 144.

At an operation 906, the representation of the physical movement may be translated into a virtual interaction by the user with the three-dimensional virtual environment. In various implementations, the virtual action management component 146 may identify, based on information in the virtual action datastore 134, virtual interactions that correspond to the physical movement. The virtual action management component 146 may, for instance, identify whether specific physical translations, rotations, etc. correspond to specific virtual movements in the three-dimensional virtual environment. The virtual action management component 146 may identify specific gestures, such as pinches, zooms, one- or two-handed resize requests, rotations, etc.

At an operation 908, a virtual action in the three-dimensional virtual environment may be identified. The virtual action may correspond to the virtual interaction. The virtual action management component 146 may identify specific virtual actions that correspond to the virtual interaction. As an example, the virtual action management component 146 may identify whether or not specific virtual objects in the three-dimensional virtual environment are associated with the virtual interaction. In some implementations, the virtual action management component 146 modifies the state of a virtual object (e.g., a three-dimensional virtual cursor) within the three-dimensional virtual environment. In various implementations, the virtual action management component 146 may use collision-based properties to determine whether a representation of the user interaction element virtually collides with a virtual object. In some implementations, the virtual action management component 146 requests the physics system management component 150 to calculate interactions between a point cloud associated with the user interaction element and a virtual object.

At an operation 910, instructions may be provided to the display device to display the virtual action. More particularly, the virtual environment control component 148 and/or the display management component 138 may instruct the display device(s) 124 to display the virtual action.

Figure 10:
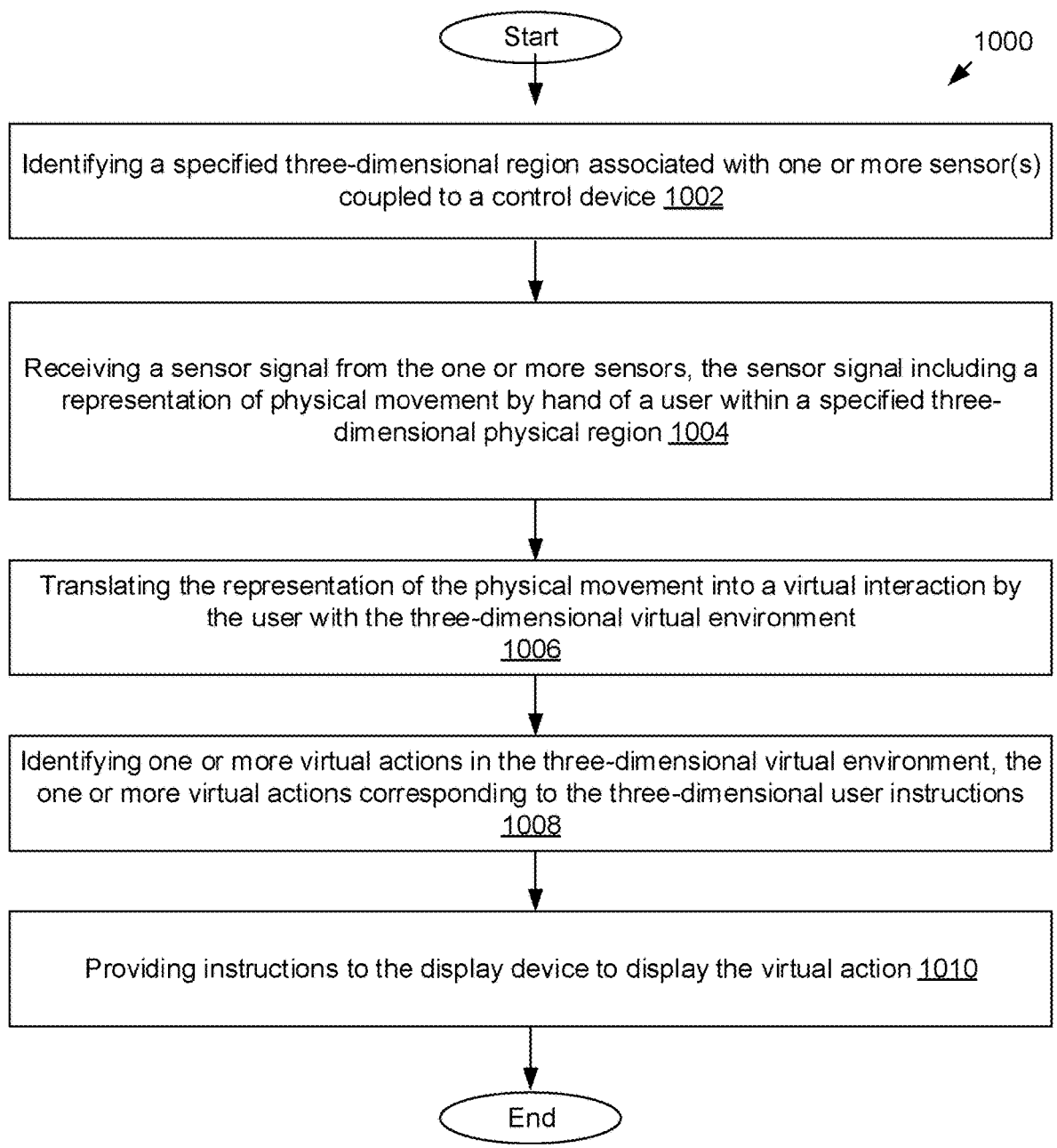
FIG. 10 is a flowchart showing an example of a process for taking a virtual action in a three-dimensional virtual environment in response to one or more hand movements in a three-dimensional physical region associated with sensor(s) coupled to a control device, in accordance with one or more implementations.

FIG. 10 is a flowchart showing an example of a process 1000 for taking a virtual action in a three-dimensional virtual environment in response to one or more hand movements in a three-dimensional physical region associated with sensor(s) coupled to a control device, in accordance with one or more implementations. The process 1000 may be implemented by the control device 102 and/or the display system 104, shown in FIG. 1 and discussed further herein. The process 1000 may be used to allow a user to control a three-dimensional virtual environment using hand movements sensed by the control device 102.

At an operation 1002, a specified three-dimensional region associated with one or more sensor(s) coupled to a control device may be identified. In various implementations, the control device management component 144 may define a specified three-dimensional physical region around the sensor(s) 110 of the control device 102 and/or sensed by the sensor(s) 120 of the display system 104. The specified three-dimensional physical region may be characterized by a region around the control device 102 that a user may use to interact with a three-dimensional virtual environment displayed by the display system 104. The specified three-dimensional physical region may correspond to a region a user of the control device 102 may use as part of an ergonomic setup, such as a portion of a seated or standing desk. In some implementations, the specified three-dimensional physical region may reside approximately where a user of the three-dimensional virtual environment would place a trackpad, a mouse, or other input device. The control device management component 144 may provide the sensor management component 118 and/or the sensor management component 140 with information to instruct the sensor(s) 110 and/or the sensor(s) 120 to sense physical movements within the specified three-dimensional physical region.

At an operation 1004, a sensor signal may be received from one or more sensors. The sensor signal may include a representation of physical movement by a hand of a user within the specified three-dimensional physical region. In various implementations, camera(s) that form a part of the sensor(s) 110 and/or the sensor(s) 120 may capture still and/or moving images of the hands as it physically moves within the three-dimensional physical region. Depth sensors that form a part of the sensor(s) 110 and/or the sensor(s) 120 may capture distances of the hand as it physically moves within the three-dimensional physical region. The sensor management component 118 and/or the sensor management component 140 may gather the sensor signal and provide a representation of the physical movement to the control device management component 144.

At an operation 1006, the representation of the physical movement may be translated into a virtual interaction by the user with the three-dimensional virtual environment. In various implementations, the virtual action management component 146 may identify, based on information in the virtual action datastore 134, virtual interactions that correspond to the physical movement. The virtual action management component 146 may, for instance, identify whether specific physical translations, rotations, etc. correspond to specific virtual movements in the three-dimensional virtual environment. The virtual action management component 146 may identify specific hand positions that correspond to known three-dimensional hand gestures, such as three-dimensional pinches, three-dimensional zooms, one- or two-handed three-dimensional resize requests, three-dimensional rotations, etc. In At an operation 1008, a virtual action in the three-dimensional virtual environment may be identified. The virtual action may correspond to the virtual interaction. The virtual action management component 146 may identify specific virtual actions that correspond to the virtual interaction. As an example, the virtual action management component 146 may identify whether or not specific virtual objects in the three-dimensional virtual environment are associated with the virtual interaction. In some implementations, the virtual action management component 146 modifies the state of a virtual object (e.g., a three-dimensional virtual cursor) within the three-dimensional virtual environment. In various implementations, the virtual action management component 146 may use collision-based properties to determine whether a representation of the user interaction element virtually collides with a virtual object. In some implementations, the virtual action management component 146 requests the physics system management component 150 to calculate interactions between a point cloud associated with the user interaction element and a virtual object.

At an operation 1010, instructions may be provided to the display device to display the virtual action. More particularly, the virtual environment control component 148 and/or the display management component 138 may instruct the display device(s) 124 to display the virtual action.

Figure 11:
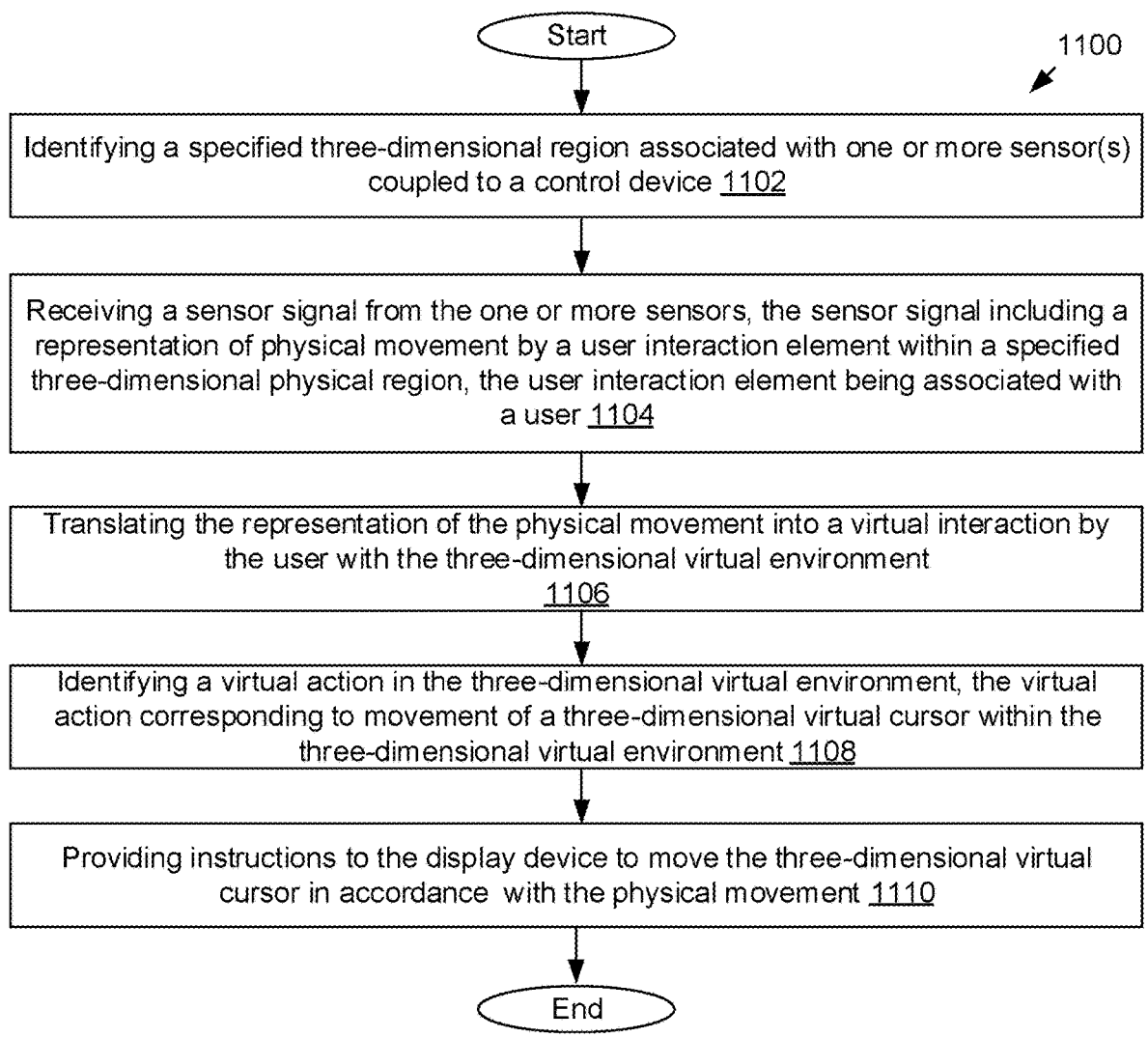
FIG. 11 is a flowchart showing an example of a process for moving a three-dimensional virtual cursor in response to physical movement in a three-dimensional physical region associated with sensor(s) coupled to a control device, in accordance with one or more implementations.

FIG. 11 is a flowchart showing an example of a process 1100 for moving a three-dimensional virtual cursor in response to physical movement in a three-dimensional physical region associated with sensor(s) coupled to a control device, in accordance with one or more implementations. The process 1100 may be implemented by the control device 102 and/or the display system 104, shown in FIG. 1 and discussed further herein. The process 1000 may be used to allow a user to display a three-dimensional virtual cursor in a three-dimensional virtual environment using the control device 102.

At an operation 1102, a specified three-dimensional region associated with one or more sensor(s) coupled to the control device may be identified. In various implementations, the control device management component 144 may define a specified three-dimensional physical region around the sensor(s) 110 of the control device 102 and/or sensed by the sensor(s) 120 of the display system 104. The specified three-dimensional physical region may be characterized by a region around the control device 102 that a user may use to interact with a three-dimensional virtual environment displayed by the display system 104. The specified three-dimensional physical region may correspond to a region a user of the control device 102 may use as part of an ergonomic setup, such as a portion of a seated or standing desk. In some implementations, the specified three-dimensional physical region may reside approximately where a user of the three-dimensional virtual environment would place a trackpad, a mouse, or other input device. The control device management component 144 may provide the sensor management component 118 and/or the sensor management component 140 with information to instruct the sensor(s) 110 and/or sensed by the sensor(s) 120 of the display system 104 to sense physical movements within the specified three-dimensional physical region.

At an operation 1104, a sensor signal may be received from one or more sensors. The sensor signal may include a representation of physical movement by a user interaction element within the specified three-dimensional physical region. The user interaction element may be associated with a user. In various implementations, the sensor signal may include a representation of translations, rotations, etc. of a user's hand, stylus, attached physical object, or other user interaction element. In various implementations, camera(s) that form a part of the sensor(s) 110 and/or the sensor(s) 120 may capture still and/or moving images of the user interaction element as it physically moves. Depth sensors that form a part of the sensor(s) 110 and/or the sensor(s) 120 may capture distances of the user interaction element as it physically moves. The sensor management component 118 may gather the sensor signal and provide a representation of the physical movement to the control device management component 144.

At an operation 1106, the representation of the physical movement may be translated into a virtual interaction by the user with the three-dimensional virtual environment. In various implementations, the virtual action management component 146 may identify, based on information in the virtual action datastore 134, virtual interactions that correspond to the physical movement. The virtual action management component 146 may, for instance, identify whether specific physical translations, rotations, etc. correspond to specific virtual movements in the three-dimensional virtual environment. The virtual action management component 146 may identify specific gestures, such as pinches, zooms, one- or two-handed resize requests, rotations, etc.

At an operation 1108, a virtual action in the three-dimensional virtual environment may be identified. The virtual action may correspond to a movement of a three-dimensional virtual cursor within the three-dimensional virtual environment. The virtual action management component 146 may identify specific virtual actions that correspond to the virtual interaction. As an example, the virtual action management component 146 may identify specific movements of the three-dimensional virtual cursor within the three-dimensional virtual environment. Specific distances and speeds may be determined and/or implemented. In various implementations, the virtual action management component 146 may use collision-based properties to determine whether a representation of the user interaction element virtually collides with a virtual object. In some implementations, the virtual action management component 146 requests the physics system management component 150 to calculate interactions between a point cloud associated with the user interaction element and a virtual object.

At an operation 1110, instructions may be provided to the display device to move the three-dimensional virtual cursor in accordance with the physical movement. More particularly, the virtual environment control component 148 and/or the display management component 138 may instruct the display device(s) 124 to move the three-dimensional virtual cursor in accordance with the physical movement.

Figure 12:
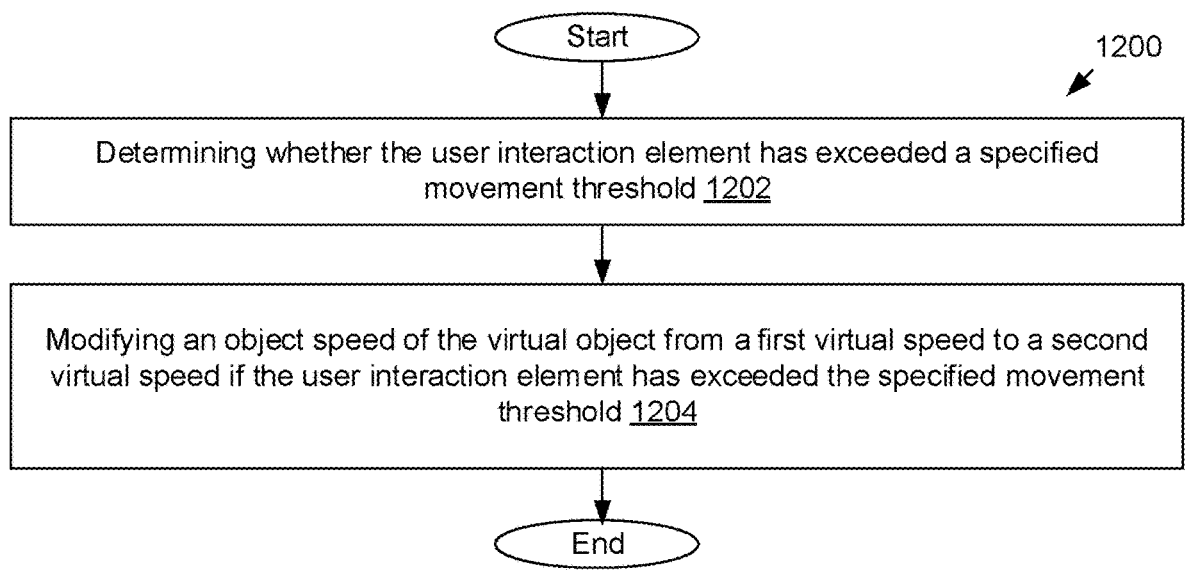
FIG. 12 is a flowchart showing an example of a process for supporting a plurality of virtual speeds of a virtual object in a three-dimensional virtual environment, in accordance with one or more implementations.

FIG. 12 is a flowchart showing an example of a process 1200 for supporting a plurality of virtual speeds of a virtual object in a three-dimensional virtual environment, in accordance with one or more implementations. The process 1200 may be implemented by the control device 102 and/or the display system 104, shown in FIG. 1 and discussed further herein. At an operation 1202, it may be determined whether or not the user interaction element has exceeded a specified movement threshold. At an operation 1204, an object speed of the virtual object may be modified from a first virtual speed to a second virtual speed if the user interaction element has exceeded the specified movement threshold. The process 1200 may be used to modify the speed of a three-dimensional virtual cursor. In some implementations, the process 1200 may be implemented as part of the operation 1108 of process 1100 shown in FIG. 11.

Figure 13:
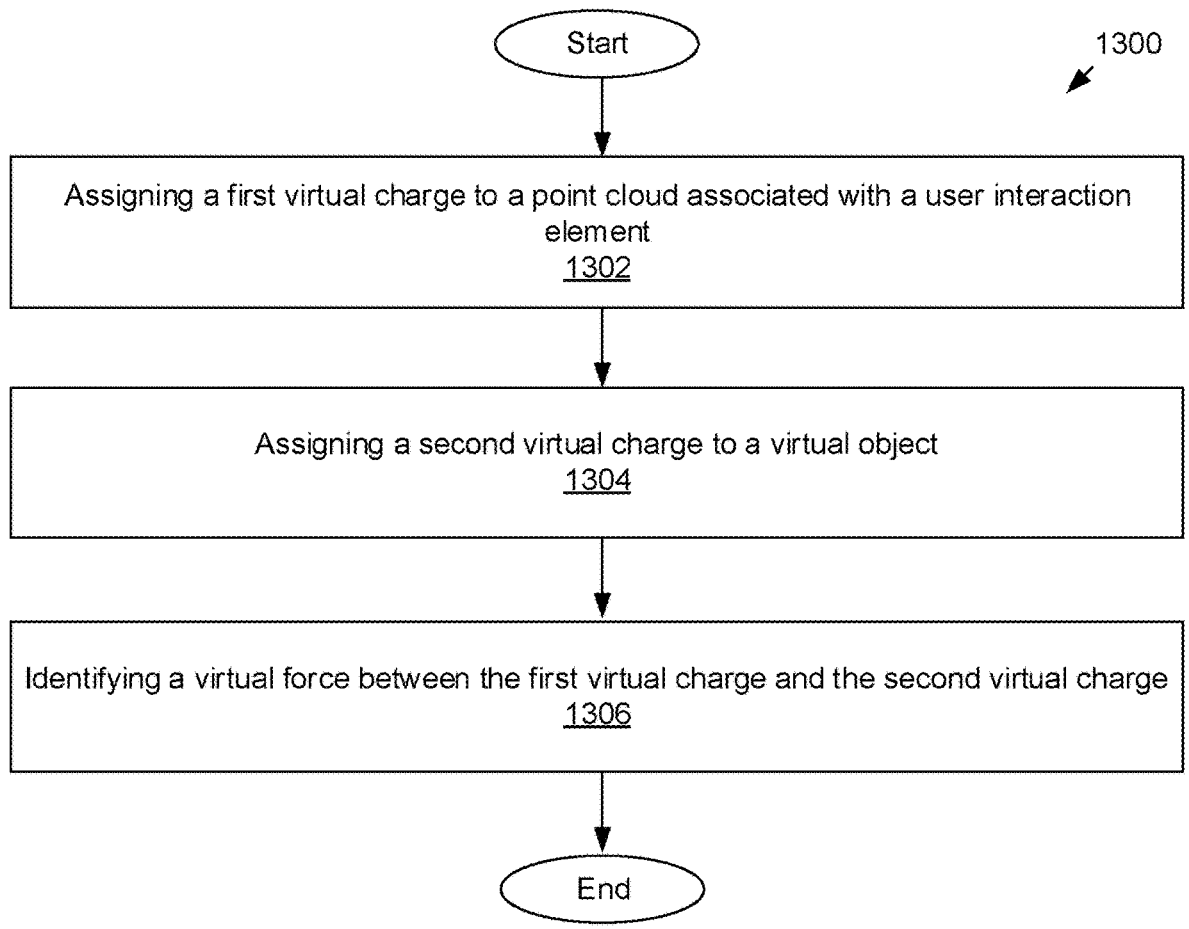
FIG. 13 is a flowchart showing an example of a process for translating a representation of a physical movement into a virtual interaction by a user with a three-dimensional virtual environment, in accordance with one or more implementations.

FIG. 13 is a flowchart showing an example of a process 1300 for translating a representation of a physical movement into a virtual interaction by a user with a three-dimensional virtual environment, in accordance with one or more implementations. The process 1300 may be implemented by the control device 102 and/or the display system 104, shown in FIG. 1 and discussed further herein. At an operation 1302, a first virtual charge may be assigned to a point cloud associated with a user interaction element. At an operation 1304, a second virtual charge may be assigned to a virtual object in a three-dimensional virtual environment. At an operation 1306, a virtual force between the first virtual charge and the second virtual charge may be identified.

Figure 14:
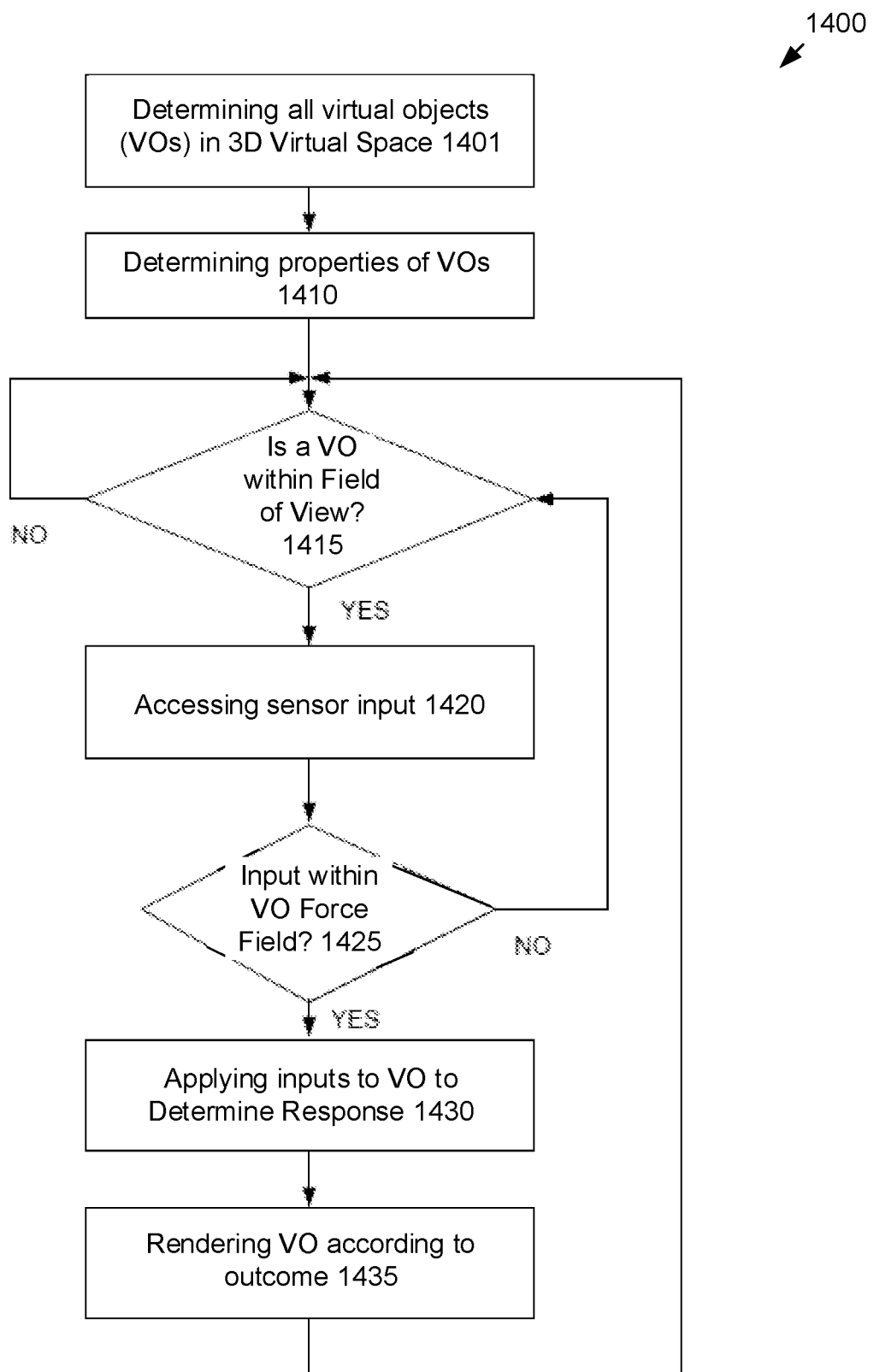
FIG. 14 is a flowchart showing an example of a process for interacting with virtual objects in a virtual environment, in accordance with one or more implementations.

FIG. 14 is a flowchart showing an example of a process 1400 for interacting with virtual objects in a virtual environment, in accordance with one or more implementations. The process 1400 may be implemented by one or more of the modules of the virtual environment control component 148, the physics system management component 150, and/or other modules discussed herein. At an operation 1401, the virtual objects in the 3D virtual space may be determined. For example, one or more files corresponding to the virtual 3D space may be accessed from a memory device. The virtual objects may be mapped to initial coordinates within the 3D virtual space.

At an operation 1414, the properties of all the virtual objects determined to be in the virtual 3D space may be accessed from a corresponding file in a memory device. For example, the primitives and their corresponding parameters may be accessed, such as an interaction volume (e.g., charge and one or more field boundaries).

At an operation 1415, it may be determined whether a virtual object may be in a field of view of a sensor. For example, a sensor detecting real world objects may be oriented to coincide with the field of view of a user of a head mounted display (HMD). As the camera may be pointed in a direction corresponding to the movement of the head of user, the view in the virtual 3D space may be mapped to coincide with the movement of the sensor and head. Scanning continues with movement of the user's and/or camera's field of view.

When one or more virtual objects may be detected, any sensor input corresponding to the field of view may be accessed in operation 1420. For example, frames of input from a depth sensor may be accessed and inputs of real world elements mapped to the virtual 3D space. In one example, a hand of user may be detected and mapped or translated to coordinates in the virtual 3D space.

At an operation 1425, for any sensor input, it may be determined whether any of the sensor input may be within an interaction volume of a virtual object. For example, a shortest distance calculation as explained above in association with FIG. 4 may be performed to determine whether a coordinate in the virtual space corresponding to a sensor input may be within boundary of a virtual object as defined by the interaction volume parameter. A spatial partitioning method (i.e., a process of dividing space into indexed and searchable regions) may be applied to speed up the boundary-checking process, and may reduce the computation overhead on the distance calculation. If no sensor input may be detected within the interaction volume of a virtual object, the process returns to operation 1415.

At an operation 1430, for a virtual object having its interaction volume penetrated by a sensor input, the sensor inputs may be applied to the virtual object to determine how the virtual object responds. For example, a force may be determined and applied to the virtual object to determine a response of the virtual object to the applied force.

At an operation 1435, the virtual objects may be rendered according to the outcome of the response determined in operation 1430, and the process returns to operation 1415.

Figure 15:
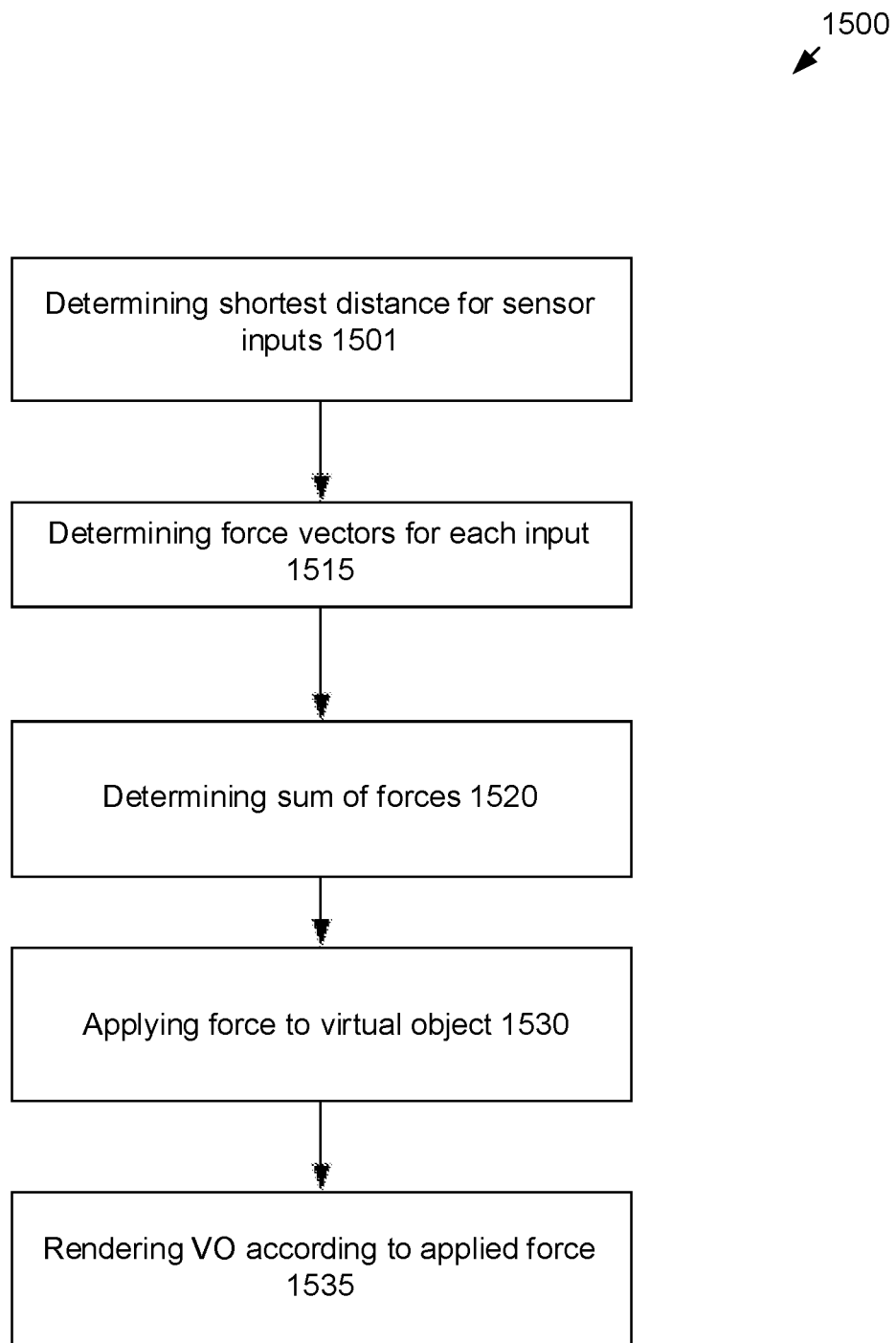
FIG. 15 is a flowchart showing an example of a process for application of sensor inputs to a virtual object in a virtual environment, in accordance with one or more implementations.

FIG. 15 is a flowchart showing an example of a process 1500 for application of sensor inputs to a virtual component in a virtual environment, in accordance with one or more implementations. In an example, the process 1500 is implemented as part of operation 1430 in the process 1400 shown in FIG. 14.

At an operation 1501, the shortest distance $d_s$ to a virtual object for a sensor input may be determined. For example, the length of a straight line segment orthogonal to a point on the core extending from the point on the core to the coordinates of a point pi (e.g., associated with an input from a sensor) may be determined.

At an operation 1510, a force vector for a sensor input may be determined. For example, the charge and magnitude of the interaction volume may be determined (e.g., $q_1$) and the charge and magnitude of the input from the sensor may be determined (e.g., $q_i$) and the force may be calculated as:

$$F_1 = k_e \frac{q_1 q_i}{|r_{i1}|^2} d_s^{i1} \qquad \text{Equation 6}$$

At an operation 1520, the forces for all vectors of points within the interaction volume of the virtual object may be summed to determine the total force exerted on the element. For example, the total force exerted on the element can be calculated through the use of the equation: F_f=Sum(F_i)

At an operation 1530, the sum of the forces may be applied to the virtual object and an outcome may be determined based on the result of that application. For example, the calculated force for a vector and the parameters of the primitive (e.g., a constraint such as mass and center of mass) may be put into a physics engine or other logic that defines the nature of a manipulation of virtual objects in the virtual 3D space. In one implementation, the physics engine may be a process or application including a collection of equations simulating real world physics and the application of forces. For example, given the force, mass, and center of mass of the virtual object, the physics engine determines a direction and distance travelled in the virtual space from the application of the force, such as determining the linear and angular momentum of a primitive by determining the position and velocity of the primitive relative to the coordinate for the primitive's center of mass.

At an operation 1535, the outcome may be rendered and acted upon. For example, the output from the physics engine describing a direction of movement, an end move coordinate and an orientation may be provided to processor for translation to a graphics rendering of the virtual object in space over time. For example, an application of force to a virtual object may move the virtual object in the virtual 3D space from a first coordinate to a second coordinate along a line and distance determined by the engine. In another example, a force may be applied to a virtual button or touch panel. The movement of the button along a direction of constraint may cause the button to be rendered as depressed and an input corresponding to depressing the button may be activated (e.g., hitting an enter button on a virtual keypad).

IV. Example Hardware Implementations

A. Example Processing System 1600

Figure 16:
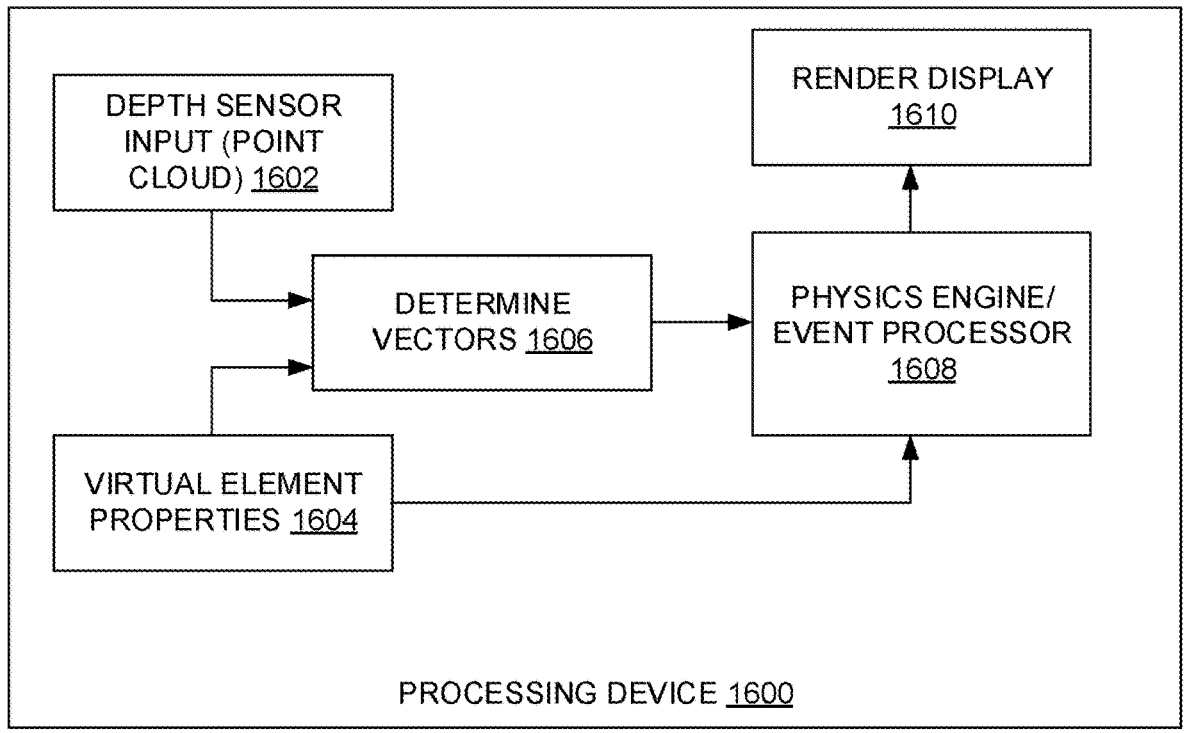
FIG. 16 shows a block diagram illustrating example components of a processing system, in accordance with some implementations.

FIG. 16 shows a block diagram illustrating example components of a processing system 1600, in accordance with some implementations. The processing system 1600 may include a depth sensor input system 1602, a virtual element properties system 1604, a vector determination system 1606, a physics engine/event processor 1608, and a display rendering system 1610. One or more of the elements of the processing system 1600 may correspond to one or more of the elements of the display system 104, shown in FIG. 1.

In some implementations, inputs from a depth sensor input system 1602 and parameters for a virtual element provided to the virtual element properties system 1604 may be input to the vector determination system 1606. In various implementations, the vector determination system 1606 may implement one or more of the vector determinations derived by the process 900 shown in FIG. 9, the process 1000 shown in FIG. 10, the process 1100 shown in FIG. 11, the process 1200 shown in FIG. 12, the process 1300 shown in FIG. 13, and/or the process 1400 shown in FIG. 14. The vectors determined by the vector determination system 1606 along with the parameters are inputs to the physics engine/event processor 1608 (which may comprise physics engine(s), event engine(s), user interaction engine(s), and/or any other defined logic to determine events and render of content associated with a virtual element within a 3D virtual environment based on the input from the sensors). The data may be output to another program or application to cause rendering of the content associated with an event for viewing by a user. For example, the output may be provided to the display rendering system 1610 for rendering in a display or other visual output device. In this manner, input corresponding to real world objects may be used to influence and manipulate virtual elements using a charge and interaction volume.

B. Example Head Mounted Display System (HMD) 1700

FIGS. 17A, 17B, 17C, 17D, and 17E illustrate examples of head mounted display (HMD) components of a system for displaying a virtual environment, in accordance with one or more implementations.

Figure 17A:
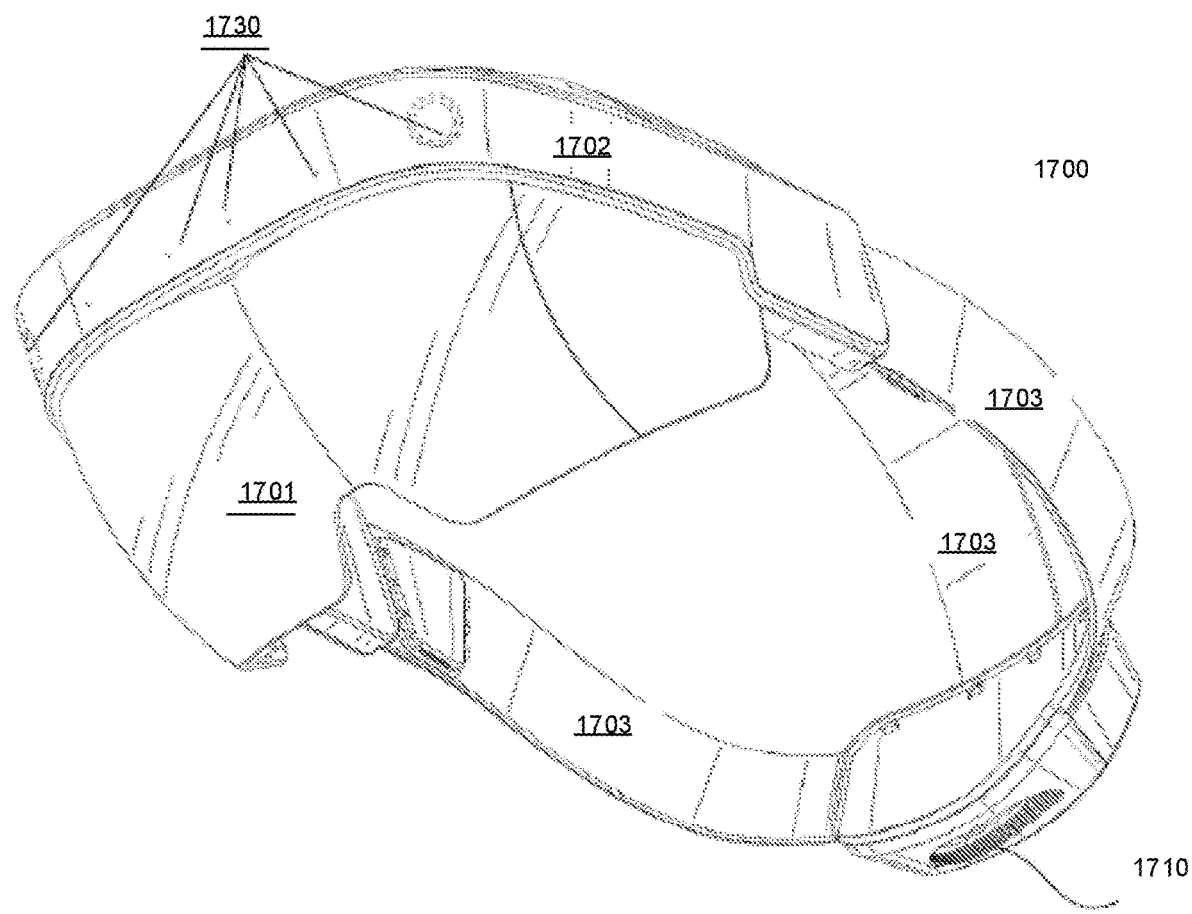
FIGS. 17A, 17B, 17C, 17D, and 17E illustrate examples of head mounted display components of a system for displaying a virtual environment, in accordance with one or more implementations.
Figure 17B:
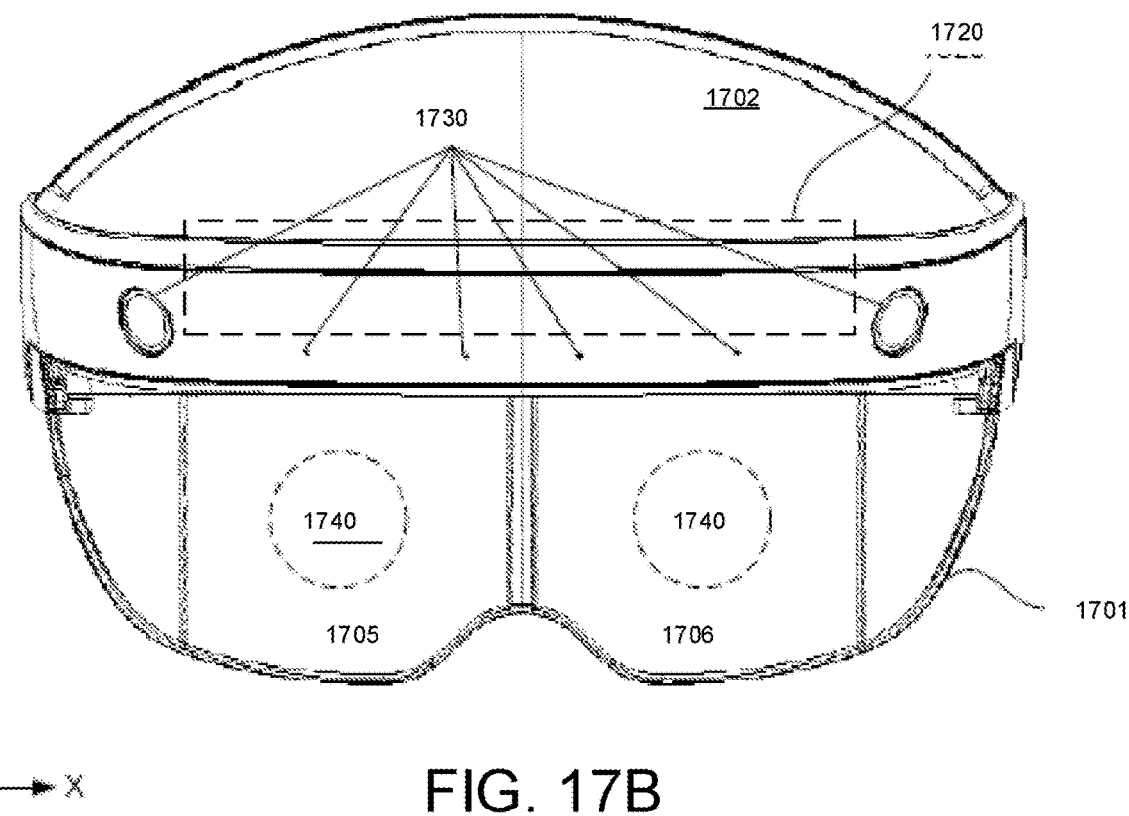
Figure 17C:
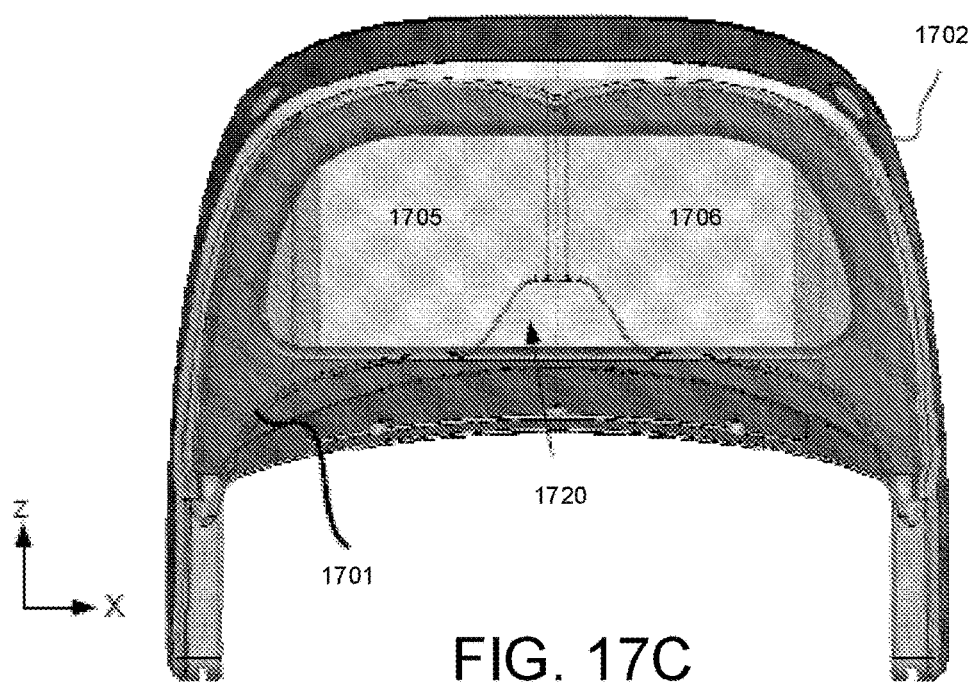

FIGS. 17A, 17B, and 17C show a perspective view, front view, and bottom view, respectively, of one example of an HMD 1700. As shown the HMD includes a visor 1701 attached to a housing 1702, straps 1703, and a mechanical adjuster 1710 used to adjust the position and fit of the HMD to provide comfort and optimal viewing by a user of the HMD 1700. The visor 1701 may include one or more optical elements, such as an image combiner, that includes a shape and one or more reflective coatings that reflect an image from an image source 1720 to the eyes of the user. In one example, the coating is partially reflective allowing light to pass through the visor to the viewer and thus create a synthetic image in the field of view of the user overlaid on the user's environment and provide an augmented reality user interface. The visor 1701 can be made from a variety of materials, including, but not limited to, acrylic, polycarbonate, PMMA, plastic, glass, and/or the like and can be thermoformed, single diamond turned, injection molded, and/or the like to position the optical elements relative to an image source and eyes of the user and facilitate attachment to the housing of the HMD.

In one implementation, the visor 1701 may include two optical elements, for example, image regions 1705, 1706 or clear apertures. In this example, the visor 1701 also includes a nasal or bridge region, and two temporal regions. The image regions are aligned with the position 1740 of one eye of a user (e.g., as shown in FIG. 17B) to reflect an image provided from the image source 1720 to the eye of a user of the HMD. A bridge or nasal region is provided between the two image regions to connect the image regions 1705 and the image regions 1706. The image regions 1705 and 1706 mirror one another through the y-z plane that bisects the nasal rejoin. In one implementation, the temporal region extends to an outer edge of the image region wrapping around the eyes to the temple housing of the HMD to provide for peripheral vision and offer support of the optical elements such that the image regions 1705 and 1706 do not require support from a nose of a user wearing the HMD.

Figure 17D:
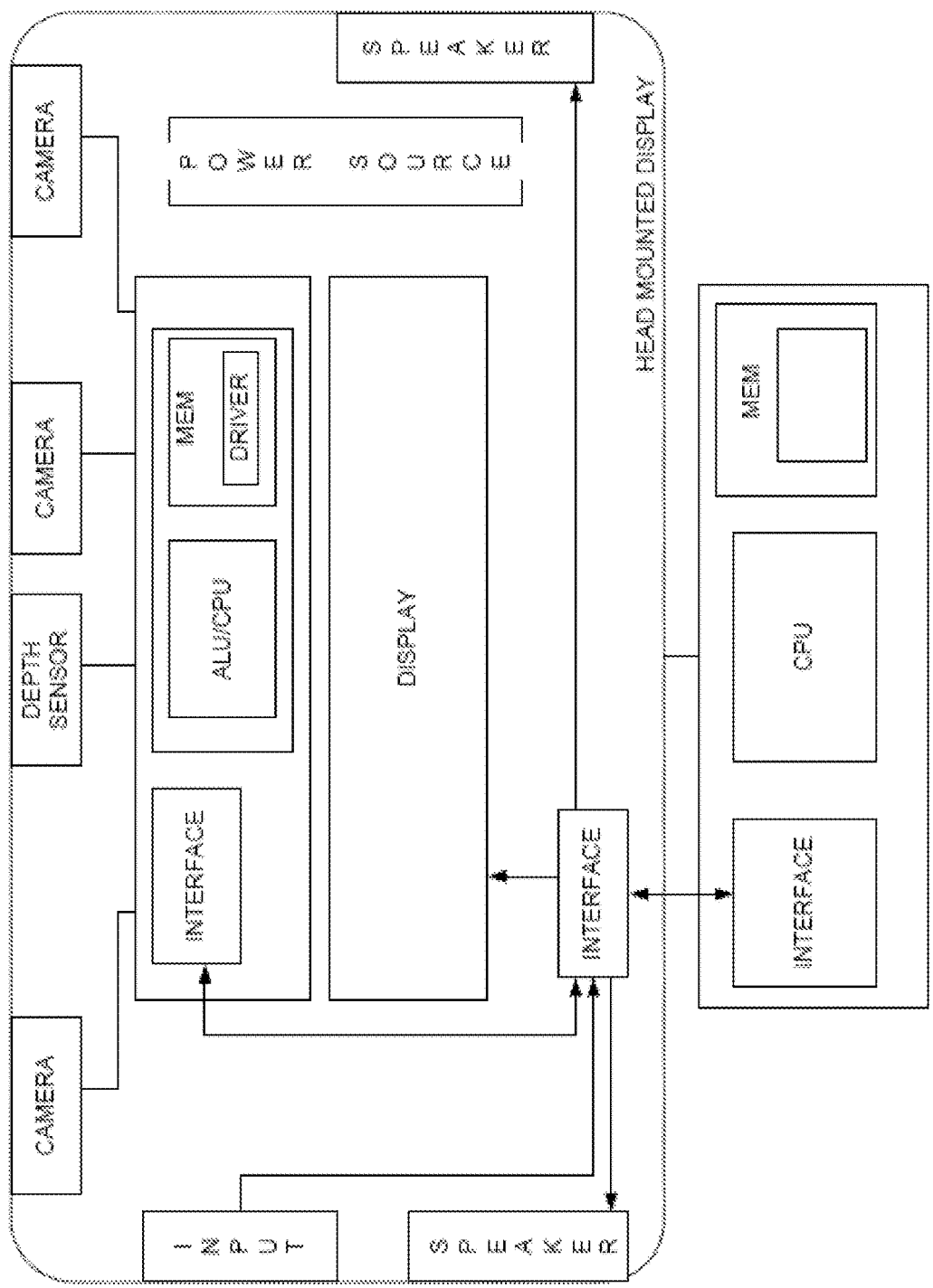
Figure 17E:
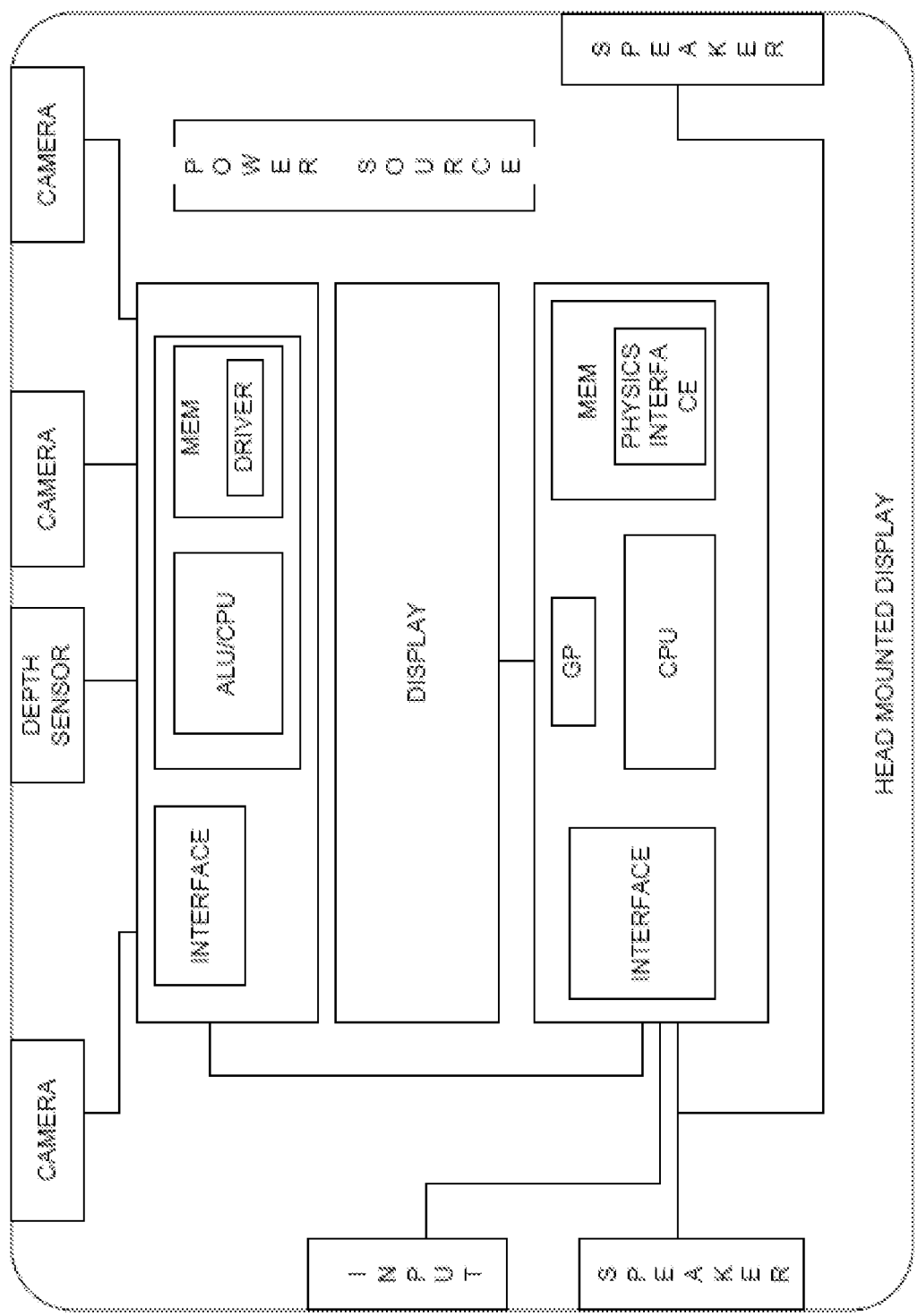

In one implementation, the housing may include a molded section to roughly conform to the forehead of a typical user and/or may be custom-fitted for a specific user or group of users. The housing may include various electrical components of the system, such as sensors 1730, a display, a processor, a power source, interfaces, a memory, and various inputs (e.g., buttons and controls) and outputs (e.g., speakers) and controls in addition to their various related connections and data communication paths. FIG. 17D shows an example implementation in which the processing device is implemented outside of the housing 1702 and connected to components of the HMD using an interface (e.g., a wireless interface, such as Bluetooth or a wired connection, such as a USB wired connector); FIG. 17E shows some implementations in which the processing device is implemented inside of the housing 1702.

The housing 1702 positions one or more sensors 1730 that detect the environment around the user. In one example, one or more depth sensors are positioned to detect objects in the user's field of vision. The housing also positions the visor 1701 relative to the image source 1720 and the user's eyes.

In one example, the image source 1720 may be implemented using one or more displays. For example, the image source may be a single display. If an optical element of the image regions 1705, 1706 of the visor is provided for eyes of user(s), the display may be partitioned into at least two halves. For example, the halves may display an image intended for a separate eye. In another example, two displays may be provided. In this example, the display is paired with a corresponding optical element or image area, where the pair provides an image to an eye of the user. Examples of displays include a liquid crystal display (LCD), a Light Emitting Diode (LED) display, a flexible organic LED (OLED) display, a Liquid Crystal on Silicon (LCoS or LCOS) and/or a fiber optic projection system. In one example, a single 4.5- to 5.2-inch diagonal Liquid Crystal Display (LCD) may be used. In another example, dual 2.8-3.4-inch diagonal LCDs, one for eyes, may be used.

In some implementations, the display may be part of a mobile phone or other mobile device that is separate from, but placed within and/or affixed to, the HMD and/or HMD housing and is subsequently detachable or removable therefrom. For example, a user-accessible opening may be provided to accept and position a mobile phone or other mobile device with a display to provide an image source for the HMD. In this example, a hatch or a slot is configured to accept the mobile phone or other mobile device and provide access to a guide, a rail, one or more walls, or a shelf to position the display of the mobile device or mobile phone outside the field of view and at the geometries according to the descriptions and examples provided herein. In yet another example, an opening may provide one or more fasteners, such as a clip or deformable member that accept and detachably lock and position the display of the mobile device or mobile phone outside the field of view and at the geometries allowing reflection to the user's eyes.

As shown in FIGS. 17D and 17E, a processing device may implement one or more applications or programs. In one example, the processing device includes an associated memory storing one or more applications implemented by the processing device that generate digital image data depicting one or more of graphics, a scene, a graphical user interface, a computer game, a movie, content from the Internet, such as web content accessed from the World Wide Web, among others, that are to be presented to a viewer of the wearable HMD. Examples of applications include media players, mobile applications, browsers, video games, and graphic user interfaces, to name but a few. In addition, virtual elements corresponding to output of the various applications may be made interactive through use of a 3D environment application implemented using any of the processes described herein.

An example with a head mounted display system and components thereof are described in U.S. patent application Ser. No. 14/945,372 titled "Wide Field of View Head Mounted Display Apparatuses, Methods and Systems" filed Nov. 17, 2015, which is herein incorporated by reference in its entirety.

As described above, the techniques described herein for a wearable AR system can be implemented using digital electronic circuitry, or in computer hardware, firmware, software, or in combinations of them in conjunction with various combiner imager optics. The techniques can be implemented as a computer program product, i.e., a computer program tangibly embodied in a non-transitory information carrier, for example, in a machine-readable storage device, in machine readable storage medium, in a computer-readable storage device or, in computer-readable storage medium for execution by, or to control the operation of, data processing apparatus or processing device, for example, a programmable processor, a computer, or multiple computers. A computer program can be written in any form of programming language, including compiled or interpreted languages, and it can be deployed in any form, including as a stand-alone program or as a module, component, subroutine, or other unit suitable for use in the specific computing environment. A computer program can be deployed to be executed by one component or multiple components of the vision system.

The exemplary processes and others can be performed by one or more programmable processing devices or processors executing one or more computer programs to perform the functions of the techniques described above by operating on input digital data and generating a corresponding output. Method steps and techniques also can be implemented as special purpose logic circuitry, e.g., an FPGA (field programmable gate array) or an ASIC (application-specific integrated circuit).

Processing devices or processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. The processing devices described herein may include one or more processors and/or cores. Generally, a processing device will also include, or be operatively coupled to receive data from or transfer data to, or both, one or more mass storage devices for storing data, such as, magnetic, magneto-optical disks, or optical disks. Non-transitory information carriers suitable for embodying computer program instructions and data include all forms of non-volatile memory, including by way of example semiconductor memory devices, such as, EPROM, EEPROM, and flash memory or solid state memory devices; magnetic disks, such as, internal hard disks or removable disks; magneto-optical disks; and CD-ROM and DVD-ROM disks. The processor and the memory can be supplemented by, or incorporated in special purpose logic circuitry.

The HMD may include various other components including various optical devices and frames or other structure for positioning or mounting the display system on a user allowing a user to wear the vision system while providing a comfortable viewing experience for a user. The HMD may include one or more additional components, such as, for example, one or more power devices or connections to power devices to power various system components, one or more controllers/drivers for operating system components, one or more output devices (such as a speaker), one or more sensors for providing the system with information used to provide an augmented reality to the user of the system, one or more interfaces from communication with external output devices, one or more interfaces for communication with an external memory devices or processors, and one or more communications interfaces configured to send and receive data over various communications paths. In addition, one or more internal communication links or busses may be provided in order to connect the various components and allow reception, transmission, manipulation and storage of data and programs.

Although the disclosed technology has been described in detail for the purpose of illustration based on what is currently considered to be the most practical and preferred implementations, it is to be understood that such detail is solely for that purpose and that the disclosure is not limited to any particular implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A method for facilitating one or more virtual interactions with a three-dimensional virtual environment, the method comprising:
   controlling a display system to present a three-dimensional virtual environment over views of a real world such that the three-dimensional virtual environment is perceived to be in a first region in the real world;
   receiving a sensor signal from one or more sensors, the sensor signal including a representation of physical movement by a user interaction element within a specified three-dimensional physical region, the specified three-dimensional physical region having a fixed spatial relationship with respect to a portable physical object in the real world such that a location of the specified three-dimensional physical region in the real world can be moved by changing a location in the real world of the portable physical object, the specified three-dimensional physical region forming a second region in the real world that is distinct from the first region in the real world, the physical movement represented by the representation of physical movement including physical movement that is devoid of physical contact with the portable physical object;
   translating the representation of the physical movement into a virtual interaction by the user with the three-dimensional virtual environment;
   identifying a virtual action in the three-dimensional virtual environment, the virtual action corresponding to the virtual interaction; and
   providing instructions to the display system to display the virtual action.

2. The method of claim 1, wherein the user interaction element comprises a hand, a stylus, or an object attached to a user.

3. The method of claim 1, further comprising identifying the specified three-dimensional physical region before receiving the sensor signal from the one or more sensors.

4. The method of claim 1, wherein the specified three-dimensional physical region is proximate to the one or more sensors.

5. The method of claim 1, wherein the physical movement comprises one or more of: a change in horizontal translation of the user interaction element, a change in vertical translation of the user interaction element, a change in pitch of the user interaction element, a change in roll of the user interaction element, and a change in yaw of the user interaction element.

6. The method of claim 1, wherein the one or more sensors comprise a depth camera configured to capture one or more images of the user interaction element, and to sense a depth of the user interaction element in a direction orthogonal to the portable physical object.

7. The method of claim 1, wherein the portable physical object comprises a mobile phone or a tablet computing device.

8. The method of claim 1, wherein translating the representation of the physical movement comprises magnifying the physical movement in the three-dimensional virtual environment.

9. The method of claim 1, wherein the virtual action comprises a movement of a virtual object across the three-dimensional virtual environment.

10. The method of claim 9, wherein the virtual object comprises a three-dimensional virtual cursor.

11. The method of claim 1, wherein the virtual action comprises a first movement of a virtual object across the three-dimensional virtual environment at a first virtual speed, and a second movement of the virtual object across the three-dimensional virtual environment at a second virtual speed.

12. The method of claim 11, further comprising:
   determining whether the user interaction element has exceeded a specified movement threshold; and
   modifying an object speed of the virtual object from the first virtual speed to the second virtual speed if the user interaction element has exceeded the specified movement threshold.

13. The method of claim 1, wherein the display system comprises a dedicated headset configured to display the three-dimensional virtual environment.

14. The method of claim 13, wherein the control device is coupled to the display system over a computer network.

15. The method of claim 1, further comprising:
   determining whether the user interaction element is outside the specified three-dimensional physical region; and
   maintaining a state of the three-dimensional virtual environment if the user interaction element is outside the specified three-dimensional physical region.

16. A system for facilitating one or more virtual interactions with a three-dimensional virtual environment, the system comprising:
   the display system configured to present a three-dimensional virtual environment over views of a real world such that the three-dimensional virtual environment is perceived to be in a first region in the real world;
   a processing unit coupled to the control device and the display system, the processing unit comprising:
      memory;
      one or more physical computer processors coupled to the memory, the one or more physical computer processors configured by computer readable instructions stored in the memory to:
         receive a sensor signal from one or more sensors, the sensor signal including a representation of physical movement by a user interaction element within a specified three-dimensional physical region, the specified three-dimensional physical region having a fixed spatial relationship with respect to a portable physical object in the real world such that a location of the specified three-dimensional physical region in the real world can be moved by changing a location in the real world of the portable physical object, the specified three-dimensional physical region forming a second region in the real world that is distinct from the first region in the real world, the physical movement represented by the representation of physical movement including physical movement that is devoid of physical contact with the portable physical object;

translate the representation of the physical movement into a virtual interaction by the user with the three-dimensional virtual environment;

identify a virtual action in the three-dimensional virtual environment, the virtual action corresponding to the virtual interaction; and provide instructions to the display system to display the virtual action.

17. The system of claim 16, wherein the user interaction element comprises a hand, a stylus, or an object attached to a user.

18. The system of claim 16, wherein the method further comprises identifying the specified three-dimensional physical region before receiving the sensor signal from the one or more sensors.

19. The system of claim 16, wherein the specified three-dimensional physical region is proximate to the one or more sensors.

20. The system of claim 16, wherein the physical movement comprises one or more of: a change in horizontal translation of the user interaction element, a change in vertical translation of the user interaction element, a change in pitch of the user interaction element, a change in roll of the user interaction element, and a change in yaw of the user interaction element.

* * * * *